United States Patent [19]

Chandler et al.

[11] Patent Number: 5,157,605
[45] Date of Patent: Oct. 20, 1992

[54] INDUCTION LOGGING METHOD AND APPARATUS INCLUDING MEANS FOR COMBINING IN-PHASE AND QUADRATURE COMPONENTS OF SIGNALS RECEIVED AT VARYING FREQUENCIES AND INCLUDING USE OF MULTIPLE RECEIVER MEANS ASSOCIATED WITH A SINGLE TRANSMITTER

[75] Inventors: Richard N. Chandler; Richard A. Rosthal, both of Houston, Tex.

[73] Assignee: Schlumberger Technology Corporation, Houston, Tex.

[21] Appl. No.: 43,130

[22] Filed: Apr. 27, 1987

[51] Int. Cl.$^5$ .............................................. G01V 3/18
[52] U.S. Cl. .................................. 364/422; 324/335; 324/339
[58] Field of Search .................... 364/422; 324/339 Y, 324/335

[56] References Cited

U.S. PATENT DOCUMENTS

| | | |
|---|---|---|
| 2,264,318 | 12/1941 | Lee . |
| 2,582,314 | 1/1952 | Doll ..................................... 324/339 |
| 2,608,602 | 8/1952 | Muffly ................................. 324/329 |
| 2,625,583 | 1/1953 | Broding .............................. 324/333 |
| 2,723,375 | 11/1955 | Schuster . |
| 2,725,523 | 11/1955 | Doll . |
| 2,761,103 | 8/1956 | Doll . |
| 2,790,138 | 4/1957 | Poupon ............................... 324/339 |
| 2,928,038 | 3/1960 | Huddleston, Jr. ................... 324/339 |
| 2,929,984 | 3/1960 | Puranen et al. .................... 324/330 X |
| 2,948,846 | 8/1960 | Coufleau . |
| 2,964,698 | 12/1960 | Lehmberg, Jr. . |
| 2,987,668 | 6/1961 | Gondouin . |
| 3,012,190 | 12/1961 | Doll ................................... 324/335 X |
| 3,051,892 | 8/1962 | Huston ............................... 324/339 |
| 3,067,382 | 12/1962 | Schuster . |
| 3,067,383 | 12/1962 | Tanguy ............................... 324/339 |
| 3,086,168 | 4/1963 | Buckner, Jr. ....................... 324/339 |
| 3,090,910 | 5/1963 | Moran . |
| 3,119,061 | 1/1964 | Tanguy ............................... 324/339 |
| 3,147,429 | 9/1964 | Moran . |
| 3,150,314 | 9/1964 | Tanguy . |
| 3,166,709 | 1/1965 | Doll ..................................... 324/339 |
| 3,179,879 | 4/1965 | Tanguy . |
| 3,226,633 | 12/1965 | Schneider .......................... 324/339 |
| 3,230,445 | 1/1966 | Sloughter et al. . |
| 3,249,858 | 5/1966 | Gouilloud . |

(List continued on next page.)

FOREIGN PATENT DOCUMENTS

| | | |
|---|---|---|
| 0084001 | 7/1983 | European Pat. Off. . |
| 136831 | 3/1960 | U.S.S.R. .............................. 324/335 |
| 737904 | 5/1980 | U.S.S.R. .............................. 324/335 |
| 2121189 | 12/1963 | United Kingdom . |
| 1016498 | 1/1966 | United Kingdom . |
| 2135461 | 8/1984 | United Kingdom . |

OTHER PUBLICATIONS

"Invasion Profile From the Digital Induction Log", P. A. S. Elkington and H. K. Patel, BPB Instruments, East Leake, Loughborough, LE12 6JQ, England.

"Digital Induction Sonde", by Peter Elkington and Hermant Patel, BPB Integrated Digital System.

Primary Examiner—Gail O. Hayes
Attorney, Agent, or Firm—Henry N. Garrana; John H. Bouchard

[57] ABSTRACT

Induction logging apparatus is disclosed which depends for its operation not only upon its arrangement of coils, but also upon the skin depth of the formation. The skin effect of the formation is used advantageously by operating a simple induction sonde at a plurality of frequencies simultaneously. Improved depth of investigation and improved vertical resolution result from the invention. Simple arrays are disclosed for the induction logging apparatus. A sonde with a single transmitter and a plurality of two-coil receiver arrays are preferred. The apparatus acquires both the in-phase and quadrature components of each receiver array signal at several frequencies. The response function is shaped by using a multi-channel deconvolution filter.

22 Claims, 9 Drawing Sheets

U.S. PATENT DOCUMENTS

| | | | |
|---|---|---|---|
| 3,259,837 | 7/1966 | Oshry | 324/339 |
| 3,327,203 | 6/1967 | Attali . | |
| 3,329,889 | 7/1967 | Tanguy . | |
| 3,405,349 | 10/1968 | Moran . | |
| 3,414,805 | 12/1968 | Attali . | |
| 3,457,496 | 7/1969 | Schuster . | |
| 3,457,497 | 7/1969 | Schuster . | |
| 3,457,498 | 7/1969 | Schuster . | |
| 3,457,499 | 7/1969 | Tanguy . | |
| 3,457,500 | 7/1969 | Schuster . | |
| 3,496,455 | 2/1970 | Couillond | 324/339 |
| 3,706,025 | 12/1972 | Regat | 324/339 |
| 4,047,098 | 9/1977 | Duroux | 324/335 |
| 4,157,579 | 6/1979 | Paul | 324/330 X |
| 4,451,789 | 5/1984 | Meador | 324/335 X |
| 4,467,425 | 8/1984 | Schaefer et al. . | |
| 4,471,436 | 9/1984 | Schaefer et al. . | |
| 4,472,684 | 9/1984 | Schuster . | |
| 4,513,376 | 4/1965 | Barber | 364/422 |
| 4,544,892 | 10/1985 | Kaufman et al. | 324/334 |
| 4,629,990 | 12/1986 | Zandee | 324/335 X |

INDUCTION LOGGING METHOD AND APPARATUS INCLUDING MEANS FOR COMBINING IN-PHASE AND QUADRATURE COMPONENTS OF SIGNALS RECEIVED AT VARYING FREQUENCIES AND INCLUDING USE OF MULTIPLE RECEIVER MEANS ASSOCIATED WITH A SINGLE TRANSMITTER

BACKGROUND OF THE INVENTION

1. Field of the Invention

This invention generally relates to a method and apparatus for investigating earth formations traversed by a borehole, and more particularly, pertains to a new and improved method and apparatus for electromagnetic well logging. Still more particularly this invention relates to a new and improved method and apparatus for acquiring multiple signals during induction logging, combining these signals in software, and creating a depth tagged representation of resistivity or conductivity from a weighted sum of signals from that depth or from that depth and neighboring depths.

2. Description of the Prior Art

Generally speaking, in electromagnetic well logging, commonly referred to as "induction logging," a transmitter coil energized by alternating current is lowered into a well or borehole and indications are obtained of the influence of surrounding formations on the electromagnetic field established by the coil. Usually such indications are obtained by observing the voltage induced in a receiver coil lowered into the borehole in coaxial relationship with the transmitter coil and axially spaced apart therefrom.

Commonly available induction logging tools include a transmitter array and a receiver array each consisting of a set of coils connected together in series. Such a transmitter/receiver array is illustrated in U.S. Pat. No. 3,067,383 issued Dec. 4, 1962 to Dennis R. Tanguy. The transmitter is driven by a constant amplitude current at 20 kHz. The induction measurement consists of recording the total voltage induced in the receiver array.

Such commonly available commercial logging tools in service today record only the component of the total voltage which is 180 degrees out of phase (called the "in-phase" or "real voltage, R") with the transmitter current. Such an induction sonde is sensitive to a spatial average of the conductivity of the surrounding formation. The averaging function is determined by the placement and winding of the transmitter and receiver coils.

Logging methods and apparatus are described in U.S. Pat. No. 4,513,376 issued Apr. 23, 1985 to Thomas Barber where not only is determined the real "R" or in-phase of the receiver voltage component, but also the quadrature or 90° out-of-phase "X" component of the receiver voltage. The R and X components are used to estimate formation resistivity.

Only minimum processing of the receiver data is currently used with commercially available tools to enhance receiver voltage signals. Tools designed for medium radial measurement of conductivity use a single point by point boost method to account for skin-effect in the formation. Such a "boosting" of the receiver signal is described in U.S. Pat. No. 3,226,633 issued Dec. 28, 1965 to W. P. Schneider.

Tools designed for deep radial measurement of conductivity use a three depth deconvolution process followed by a skin effect boost. Such a deconvolution process is described in U.S. Pat. No. 3,166,709 issued Jan. 19, 1965 to Henri-Georges Doll. The purpose of the three point deconvolution is to reduce the tool response sensitivity to high conductivity shoulders which are far away.

Another approach to induction logging is described in a paper by D. W. Martin presented to an SPWLA Symposium in 1984 entitled, "The Digital Induction—A New Approach to Improving the Response of the Induction Measurement". Martin describes a "Digital Induction Sonde" which includes four receiver coils spaced vertically above a transmitter coil on a sonde mandrel The signal induced in each of the four receiver coils is amplified, digitized and transmitted direct to the surface for computer processing before the resistivity is determined for the borehole log.

All the "raw data" from the receiver coils is recorded and stored for computer processing. Specifically, the depth of investigation can, during post job processing be varied continuously, thereby allowing an invasion profile to be produced.

Identification of Objects of the Invention

It is generally an object of the invention to provide an improved induction method and apparatus having advantages and features superior to the induction logging methods and systems of the prior art.

It is an object of the invention to provide a new and improved induction sonde arrangement for induction logging.

It is another object of the invention to provide multiple receiver arrays having different array lengths for surface multi-channel deconvolution processing at a measure depth and adjacent depths.

It is another object of the invention to provide induction logging apparatus in which multiple frequencies are used to excite the transmitter, thereby inducing multiple receiver signals, each with a different associated spatial response.

It is another object of the invention to provide an induction logging system with multiple frequency excitation in which both in-phase and quadrature components of each receiver signal are acquired.

It is another object of the invention to provide an accurate model for the response functions of the arrays as a function of coil placement, conductivity and frequency.

SUMMARY

The objects identified above as well as other advantages and features of the invention are incorporated in a new and improved multi-channel induction sonde having a single transmitter coil and at least one receiver coil array. A source of electrical energy is coupled to the transmitter coil. The electrical energy source includes at least two distinct oscillating signals, the frequency of each signal being substantially constant. Electrical receivers including an amplifier, A/D converter and multi-frequency phase sensitive detector are coupled to the receiver arrays for producing receiver signals at the frequencies of the oscillator source. A surface instrumentation unit digital processor combines the signals and produces an output signal representative of a characteristic of the formation.

In a preferred embodiment of the invention, a plurality of receiver arrays, $R_1$, $R_2$, $R_3$, etc. are coaxially mounted with the transmitter coil. Each of the receiver coils has a primary receiver coil disposed at increasing longitudinal distances, $L_1$, $L_2$, $L_3$, etc., from the transmitter coil. The odd numbered receiver arrays, $R_1$, $R_3$, $R_5$, etc., are mounted on one longitudinal side of the transmitter coil, and the even numbered receiver arrays, $R_2$, $R_4$, $R_6$, etc., are mounted on the opposite longitudinal side of the transmitter coil. Electrical receivers produce an in-phase (R) signal and an out-of-phase (X) signal for each array at each of the frequencies of the source of electrical energy. Such signals are stored for each of the measurement locations in the borehole as the induction sonde is transported through it. For each measurement location, such stored signals are combined by using a predetermined weighting matrix to produce a signal representative of the conductivity or resistivity of the formation at that measurement location. Such signals are recorded as a function of measurement depth to produce a log of the characteristic.

A method for obtaining a radial profile at a measurement location is also provided whereby a transmitter coil is driven with at least two oscillating currents of different frequencies. A first signal from a receiver coil at frequency $f_1$ and a second signal $f_2$ from such receiver coil are obtained and a difference signal between such signals is produced. The difference signal is representative of a characteristic of the formation at a greater radial depth than the first signal or the second signal.

BRIEF DESCRIPTION OF THE DRAWINGS

The objects, advantages and features of the invention will become more apparent by reference to the drawings which are appended hereto and wherein like numerals indicate like parts and wherein an illustrative embodiment of the invention is shown, of which.

DESCRIPTION OF THE INVENTION

Figure 1:
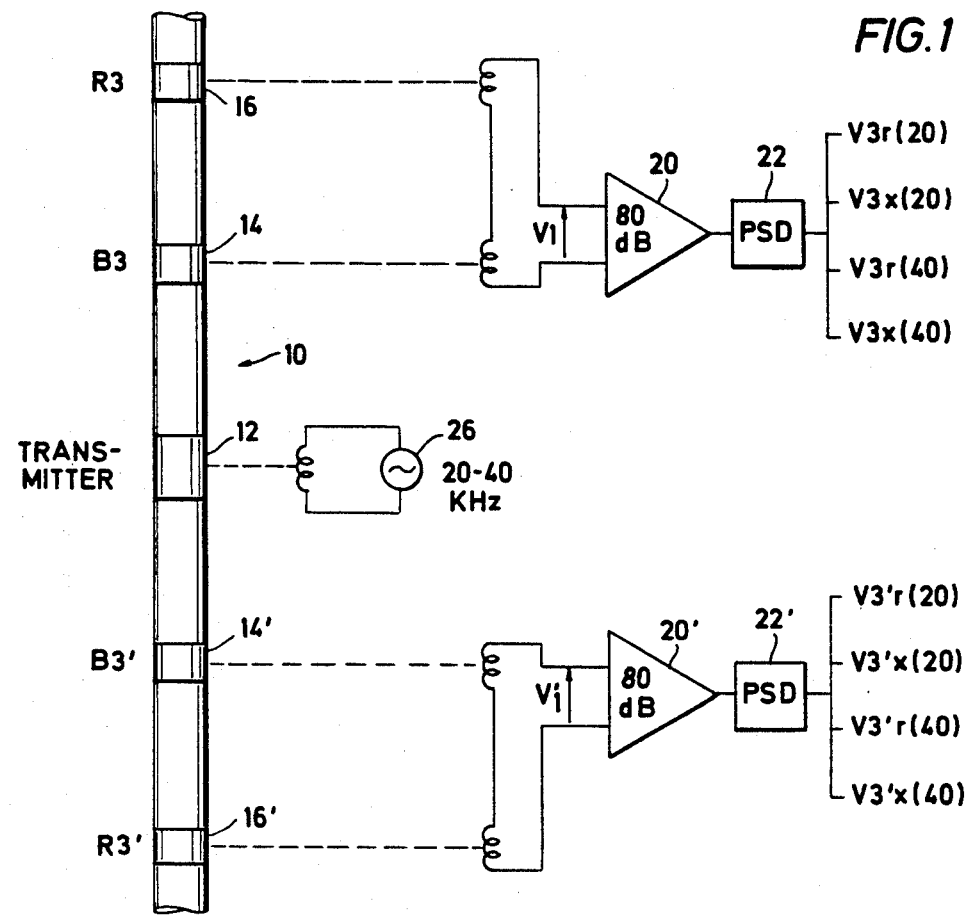
FIG. 1 illustrates a balanced symmetrical induction logging sonde with a single transmitter and a pair of two coil receiver arrays, where the transmitter is excited with simultaneous multiple frequencies and the received induced voltages at individual frequencies are separated into in-phase and quadrature components.

FIG. 1 illustrates a sonde arrangement 10 according to the invention. Simple individual arrays are preferred generally consisting of a single transmitter coil and two receiver coils 16, 14 (16', 14'). The basic three-coil array includes a primary receiver coil 16 located at a distance L from the transmitter. A secondary or bucking coil 14 acts as a mutual inductance balancing coil. The secondary coil is connected in series with the primary coil, but is wound in an opposite sense to the primary coil. The placement of the secondary coil between the transmitter coil 12 and the primary receiver coil 16 is a matter of choice, but once its placement is fixed, the number of its windings may be selected so as substantially to balance or null the direct mutual coupling between the transmitter and the receiver array. If the position of the secondary coil is selected to be L/2, or half-way between the transmitter coil 12 and the receiver coil 16, it requires one-eighth as many turns as for the primary receiver coil 16.

Preferably the multi-channel sonde 10 is constructed of a number of these simple arrays by placing a single transmitter 12 at the center of the tool and placing pairs of receiver coils such as pairs 16,14 and 16',14' on either side of it. Amplifiers 20, 20' and phase-sensitive detectors 22, 22' (PSD) may be constructed of conventional analog induction electronics but preferably digital PSD are used as will be discussed below with regard to a particular preferred embodiment. As illustrated, a multi-frequency oscillator 26, operating at frequencies of 20 and 40, kHz excite transmitter 12. The receiver arrays, spaced, for example, three feet from transmitter 12, respond with voltage signals, $v_1$, $v_1'$ which depend on formation characteristics. Such voltage signals are amplified and resolved into in-phase (R) and out-of-phase or quadrature (X) components at the two excitation frequencies 20 and 40 kHz. As a result eight channels of information are produced from two arrays, two oscillation frequencies, and two components of the response signal (in-phase and quadrature).

Figure 2:
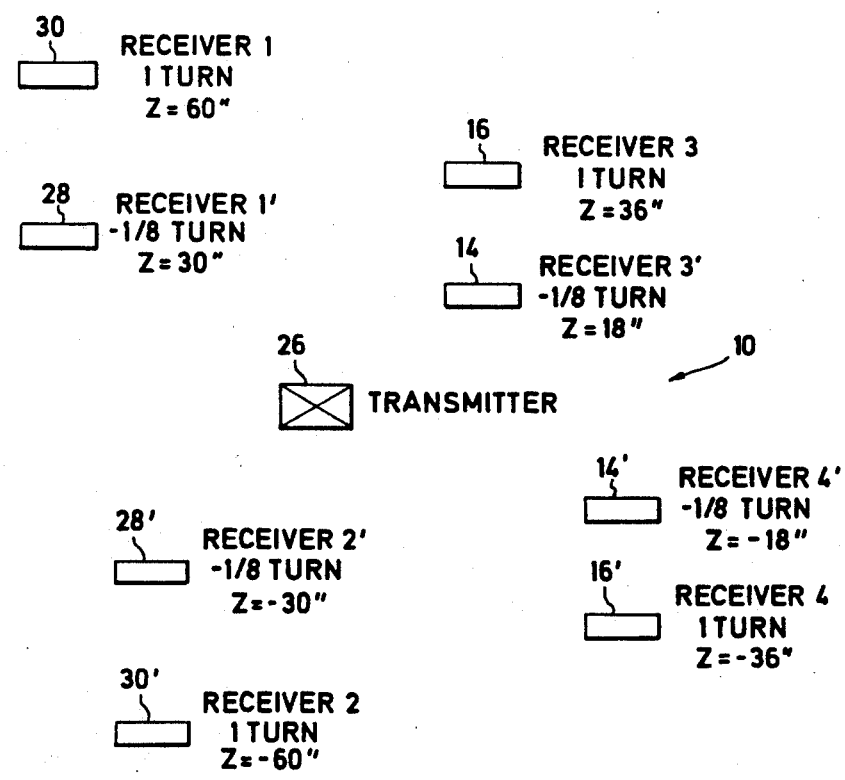
FIG. 2 illustrates a balanced four receiver induction design.

FIG. 2 illustrates schematically a four receiver array sonde 10' including receiver arrays placed at three feet on both sides of the transmitter. Receiver arrays are also provided having their main receiver coils spaced at five feet on both sides of the transmitter. Many other receiver arrays may be placed above and/or below transmitter coil 26, depending on the preferred design of the induction equipment.

As the description of the deconvolution processors will show below, more information channels allow more precise determination of formation characteristics, but adding more and more receiver arrays ultimately undesirably lengthens the sonde, making it more difficult to use practically in field operations. It should also be mentioned here that more than two frequencies may be used with the logging system. Oscillators 26 may, for example, include current signals of 20, 40, 80 and 160 or 25, 50, 100 and 200 kHz. Certain frequencies may be used with certain receiver arrays. For example, the five foot receivers of FIG. 2 may be sensed at 20 and 40 kHz while the three foot receivers may be sensed at 20 and 160 kHz, etc.

At the heart of the invention is a method and apparatus for deconvolving or "weighting" in a summation the various received signal channels of sondes such as illustrated in FIGS. 1 and 2. The invention involves a multi-channel sonde having a plurality of arrays (not necessarily balanced and symmetrical as shown in FIGS. 1 and 2) with different spatial responses (e.g., the arrays are of different lengths from the transmitter coil) and uses deconvolution to combine the output of these arrays in digital processing under software control at a surface instrumentation system.

Deconvolution is used here as defined by Doll to mean that the output measurement (for example, conductivity or resistivity) at a particular depth is computed from a weighted combination of the sonde response at the measure depth and adjacent depths. Multichannel deconvolution is a generalization of this induction deconvolution in that data from a number of depth points from several arrays are weighted and summed to determine the output measurement at a given depth.

The description below describes the design of a multichannel deconvolution filter assuming that there is no skin effect. The technique is then extended to include skin effect.

Multi-channel Deconvolution Filter Assuming No Skin Effect

When the formation conductivity is low, the currents in the formation are small; consequently the fields in the formation are not significantly different from those which would exist in a vacuum. In other words, skin effect is small and may be ignored. In that case, each of the n arrays produces a spatial average of the formation conductivity $$\sigma_n(z) = \delta g_n(\rho, z-z') \sigma(\rho, z') d\rho dz'. \quad (1)$$

The variables of equation (1) are
$\sigma_n$ = conductivity as measured by the nth channel in the array,
$\rho$ = radial distance from the center line of the borehole,
$z'$ = distance from the measure point z of the sonde,
$\sigma(\rho, z')$ = the conductivity pattern of the formations adjacent the borehole,
$g_n(\rho, z')$ = the response function of the nth channel in the array.

The response function $g(\rho, z)$ is independent of the formation and can be calculated using Maxwell's equations in free space. The result is simply the well known Doll geometrical factor. Filters described immediately below are based on linear theory.

For formations which have no radial variation, the $\rho$ integration may be done to obtain:

$$\sigma_n(z) = \delta g_n(z-z') \sigma(z') dz' \quad (2)$$

$$g_n(z) = \delta g_n(\rho, z) d\rho \quad (3)$$

Similarly, in formations where there is no vertical variation, the z integration may be performed to obtain:

$$\sigma_n = \delta g_n(\rho) \sigma(\rho) d\rho \quad (4)$$

where $$g_n(\rho) = \delta g_n(\rho, z) dz \quad (5)$$

The relationship is known as $g(\rho, z)$, the geometrical factor of the tool, and $g(\rho)$ and $g(z)$ are called radial and vertical geometrical factor respectively. The shape of the geometrical factor depends upon the placement and winding of the transmitter and receiver coils.

As described above, a multi-channel tool may be constructed of a number of simple arrays by placing a single transmitter at the center of the tool and placing pairs of receiver coils on one or the opposite side of it or on both sides of it. FIG. 2 illustrates the configuration for example of a possible four channel "balanced" sonde. The main coil spacings are three and five feet with receiver coils located above and below the transmitter. The response function for the sonde with the receiver coils below the transmitter is simply the reversal of the response function for the sonde with the receiver coils above the transmitter. That is:

$$g_{3cx}(\rho, z) = g_{3cxR}(\rho, -z). \quad (6)$$

The radial geometrical factors of the two sondes is the same, and so having them both does not provide any additional radial information. There is, however, additional vertical and two-dimensional information. There is also the additional benefit of ease in making the response function symmetric, and possibly a benefit in improving borehole effect.

Deconvolution filters may be designed which are optimal in the sense that the response minimizes some error norm when compared with the desired response.

Additionally there are desirable characteristics of the response of an induction tool. Often these characteristics are contradictory. Some of the most common of the characteristics are:

Vertical Response—The vertical response g(z) should be sharp to allow the determination of resistivity of a thin bed and should be symmetric. The tails of the response should die off quickly away from the peak. A smooth response without overshoot may be desired although some log analysts seem to prefer a sharper response with overshoot.

Radial Response—The Radial response $g(\rho)$ should be well localized to a known range of radial values. Often this means that the radial response should be small inside of or outside of a given radius.

Two-dimensional Effects—The response of the tool should not be overly sensitive to caves or to very high conductivity invaded regions, when the total integrated radial response is not sensitive to this region.

Noise Effects—The deconvolution process should not introduce excessive unwanted noise into the log.

It is impossible to achieve all of these characteristics simultaneously, and one of the primary advantages of this invention is that the trade-off between the various properties of the response may be varied and hence studied systematically. The basic equation of multichannel deconvolution is:

$$\sigma_d(z) = \sum_{n=1}^{N} \sum_{z'=z_{nmin}}^{z_{nmax}} \sigma_n(z - z') a_n(z') \quad (7)$$

where the subscript n refers to the channel number and $\sigma_n(z)$ is the conductivity measured by the nth array at position z. The summation goes from channel 1 to channel N and from $z_{nmin}$ to $z_{nmax}$, the minimum and maximum depth for each channel. The a's are the filter coefficients which are to be determined.

This equation implies that the signal from a set of N arrays will be obtained at a number of positions and will be weighted and added to obtain a log value. The values of the filter coefficients (a's) as well as the choice of independent arrays will determine the tool response. If each of the arrays has a response which can be written in the form of Equation 1, then the total response of the multi-channel sonde can be written in the same general form, $$\sigma_d(z) = \int_{-\infty}^{\infty} dz' \int_{-\infty}^{\infty} d\rho\, g_d(\rho, z - z') \sigma(\rho, z') \quad (8)$$

where $$g_d(\rho, z) = \sum_{n=1}^{N} \sum_{z'=z_{nmin}}^{z_{nmax}} g_n(\rho, z - z') a_n(z'). \quad (9)$$

The vertical and radial geometrical factors can also be written in terms of the filter weights and the vertical and radial geometrical factors of the individual arrays, $$g_d(z) = \sum_{n=1}^{N} \sum_{z'=z_{nmin}}^{z_{nmax}} g_n(z - z') a_n(z') \quad (10)$$

$$g_d(\rho) = \sum_{n=1}^{N} g_n(\rho) \sum_{z'=z_{nmin}}^{z_{nmax}} a_n(z'). \quad (11)$$

The two-dimensional geometrical factor, need not be considered, but rather only the vertical and radial geometrical factors of the individual subsondes. Equations 9, 10, and 11 produce the various response functions from the individual response functions and the filter weights. In order to determine the filter weights, the desired characteristics of the system must be expressed in terms of $g(\rho,z)$, $g(z)$, or $g(\rho)$. The relative importance of each of the desired characteristics must also be set which in turn will determine how the trade-off between the conflicting criteria occur.

These equations can be written more compactly in matrix form $$\begin{array}{ccc} m \times nn \times 1 & m \times 1 \\ |G| & |a| & = & |d| \end{array}. \quad (12)$$

G is a m×n matrix composed of response functions, a is a n×1 column vector of filter weights, and d is an m×1 column vector of desired characteristics. There are m equations (corresponding to m desired characteristics), in n unknowns (corresponding to n filter weights). In general, there will be more equations than unknowns, and it will not be possible to solve them exactly but the vector a will have to be determined to minimize some error. The column vector a is all the separate filter weights in order $$a = \begin{vmatrix} a_1(z_{1min}) \\ a_1(z_{1min} + \Delta z) \\ \cdot \\ \cdot \\ \cdot \\ a_1(z_{1max}) \\ a_2(z_{2min}) \\ a_2(z_{2min} + \Delta z) \\ \cdot \\ \cdot \\ \cdot \\ a_2(z_{2max}) \\ \cdot \\ \cdot \\ \cdot \\ a_N(z_{Nmax}) \end{vmatrix} \quad (13)$$

Each row of G and the corresponding value of d correspond to one of the Equations 9-11. As an example, suppose that it was desired to define a target function for the vertical geometrical factor. For instance, the vertical geometrical factor might be desired to look like a gaussian with some width $$g(z) = g_{target}(z). \quad (14)$$

In matrix notation this would correspond to $$|a| = \begin{vmatrix} g_1(z-z_{1min})\, g_1(z+\Delta z - z_{1min}) \cdots g_1(z-z_{1max})\, g_2(z-z_{2min}) \cdots g_N(z-z_{Nmax}) \\ g_1(z+\Delta z - z_{1min})\, g_1(z-z_{1min}) \cdots g_1(z+\Delta z - z_{1max}) \cdots g_2(z+\Delta z - z_{2min})\, g_N(z+\Delta z - z_{Nmax}) \\ \cdot \\ \cdot \end{vmatrix} \begin{vmatrix} g_{target}^{(z)} \\ g_{target}^{(z+\Delta z)} \end{vmatrix}.$$

If there were only a single channel to deconvolve, this would reduce to the normal formula for deconvolution and the matrix G would have a Toeplitz form. That is $$g_{ij} = G(i-j) \quad (16)$$

Instead of a target function for the vertical geometrical factor, a target function for the radial geometrical factory may be desired. For instance, the radial geometrical factor could be specified to be zero for some range of radius, e.g., $$g(\rho) = g_{target}(\rho). \quad (17)$$

This would result in a matrix equation of the form $$\begin{vmatrix} g_1(\rho) \ldots g_1(\rho) \, g_2(\rho) \ldots g_2(\rho) \ldots g_N(\rho) \\ g_1(\rho + \Delta\rho) \ldots g_1(\rho + \Delta\rho) g_2(\rho + \Delta\rho) \ldots g_2(\rho + \Delta\rho) \ldots g_N(\rho + \Delta\rho) \end{vmatrix} \quad (18)$$

$$|a| = \begin{vmatrix} g_{target}(\rho) \\ g_{target}(\rho + \Delta\rho) \end{vmatrix}.$$

All the columns of G corresponding to a single array are identical. This is due to the fact that the radial geometrical factor is calculated by integrating the two-dimensional geometrical factor over z.

Certain aspects of the induction tool behavior are due to the two-dimensional response. Certain characteristics of the two-dimensional response may be specified. This leads to a matrix equation similar to Equation 15.

$$\begin{vmatrix} g_1(\rho, z - z_{1min}) \ldots g_1(\rho, z - z_{1max}) \, g_2(\rho, z - z_{2min}) \ldots g_N(\rho, z - z_{Nmax}) \\ g_1(\rho, z + \Delta z - z_{1min}) \ldots g_1(\rho, z + \Delta z - z_{1max}) \, g_2(\rho, z + \Delta z - z_{2min}) \ldots g_N(\rho, z + \Delta z - z_{Nmax}) \end{vmatrix} \quad (19)$$

$$|a| = \begin{vmatrix} g_{target}(\rho, z) \\ g_{target}(\rho, z + \Delta z) \end{vmatrix}.$$

An example of a two-dimensional condition might be to specify the response to be zero at radii of 4, 8, and 12 inches. Such a set of conditions contributes to controlling the tool's cave effect.

Where characteristics of the vertical, radial and two-dimensional geometrical factors are to be specified simultaneously, then the form of Equation (12) is still applicable. In this case, G and d will be the vertical catenation of the corresponding matricies presented in Equations 15, 18 and 19.

In general there are more design criteria than there are unknown filter weights. Consequently Equation (12) can not be solved exactly. Instead, a combination of filter weights is to be found which minimizes some norm of the error between the actual response achieved and the desired response.

Typical norms are often written in the form:

$$\|d - Ga\|_p = \left( \sum_{i=1}^{m} |d_i - (Ga)_i|^p \right)^{1/p}. \quad (20)$$

If p=2, the norm is of the common Euclidian form, while as p→∞, the norm corresponds to the Chebychev norm. Minimizing the Euclidian norm in Equation 9 corresponds to finding the least squares solution to the equation. Minimizing the Chebychev norm corresponds to finding the solution which minimizes the maximum error between the actual and the desired solution.

In a real situation, it is important to achieve all of the design criteria by equal amounts. This problem is handled by weighting the rows in G and d of Equation 9 by various amounts. This results in a larger contribution to the error norm (be it Euclidian or Chebychev) from those equations corresponding to conditions which are more important to approximate well and a smaller contribution from those equations corresponding to conditions which are less important. It is always necessary to make such a decision on priorities. The weight does not correspond precisely with a subjective decision on relative importance, since the magnitudes of the elements of Ga may differ greatly. In particular, the $g(\rho,z)$ has the dimension of $1/(length^{**}2)$ while $g(\rho)$ and $g(z)$ have the dimension of 1/length. Thus the choice of the length scale will alter the relative importance of these equations without fundamentally changing the problem.

Equation 11 shows that the radial geometrical factor of a multi-channel sonde can be expressed as a sum of the raidal geometrical factors of the individual arrays. If the summation is performed over depth this dependence can be written more explicitly as $$g(\rho) = \sum_n A_n g_n(\rho) \quad (21)$$

where $$A_n = \sum_{z'} a_n(z'). \quad (22)$$

A number of radial functions may be combined to achieve certain radial criteria. These criteria consist of the following types of conditions for the example radial focusing:

1. Set the radial geometrical factor to a certain value for a range of r.
2. Normalize the radial geometrical factor to one.
3. Zero the mutual induction of the array. If the sonde is built up of sondes which are not mutually balanced, then the sum $\Sigma 1/L_n^3$ must be zero, where $L_n$ is the effective length of each of the sub-arrays.

Figure 3:
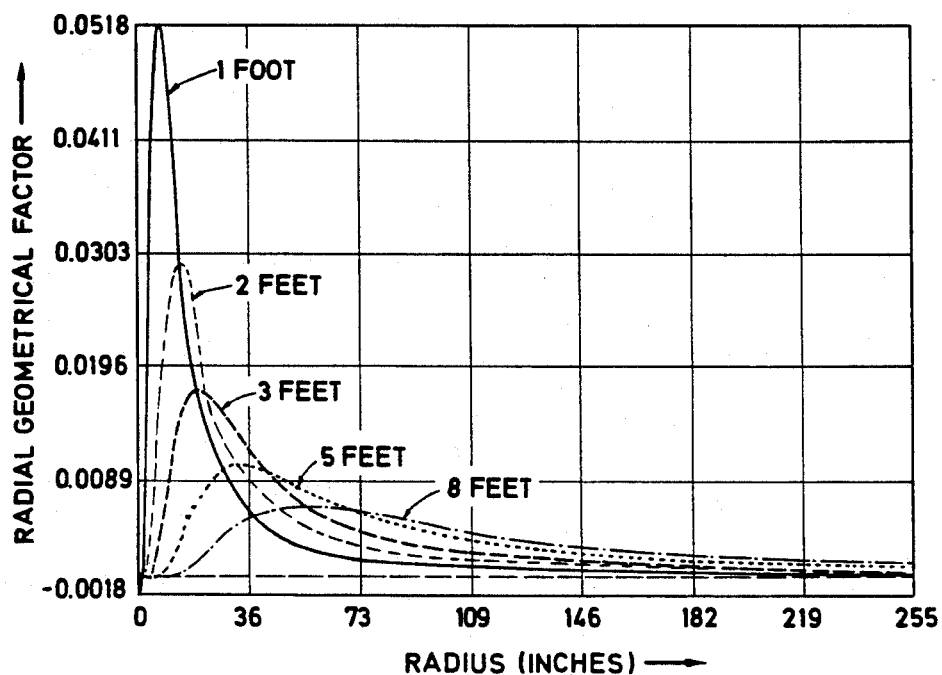
FIG. 3 illustrates individual radial response functions for three coil induction arrays with main coil spacings of 1, 2, 3, 5 and 8 feet.
Figure 4:
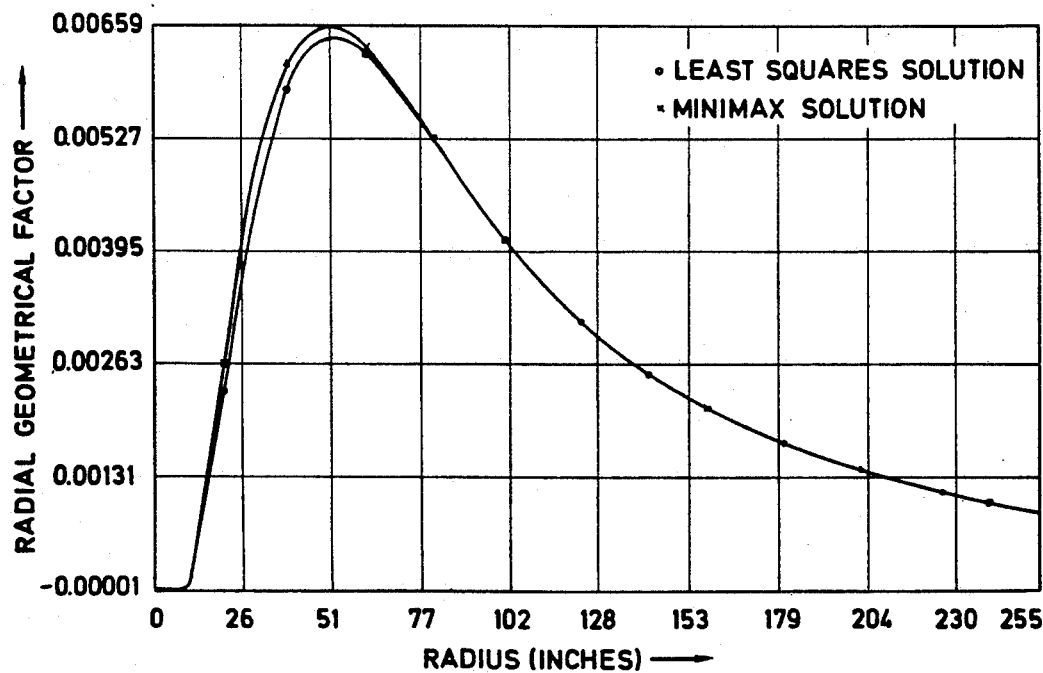
FIGS. 4–6 illustrate composite radial response functions of the outputs of three coil arrays with coil spacings 1, 2, 3, 5 and 8 feet, optimally weighted to produce respectively a zero output inside 6 inches (FIG. 4), inside 24 inches (FIG. 5) and inside 48 inches (FIG. 6)
Figure 5:
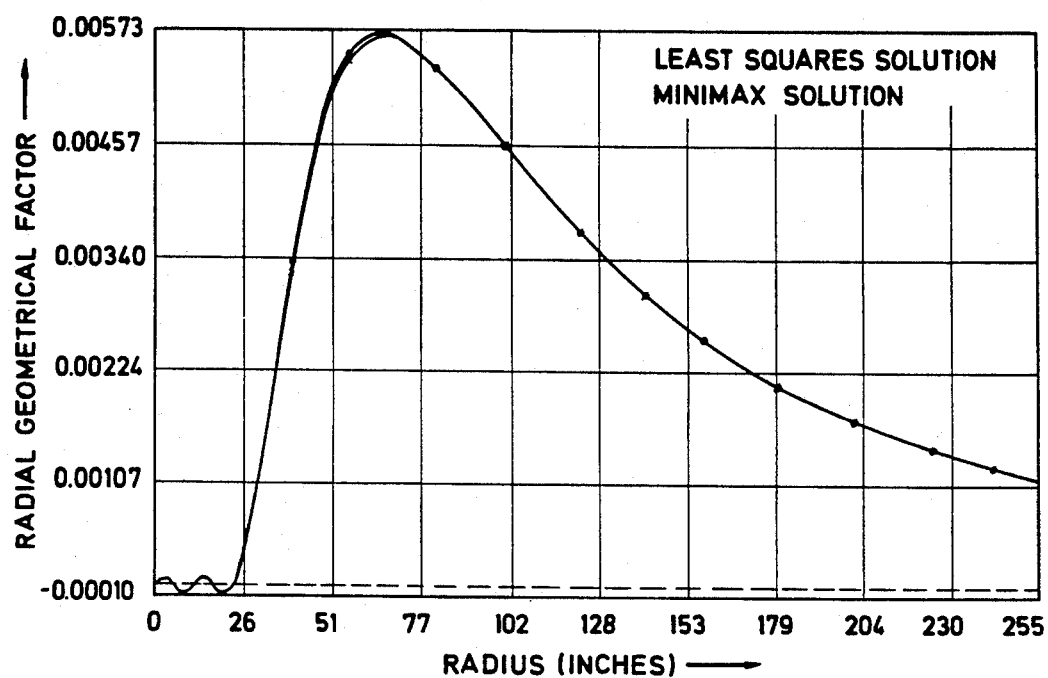
Figure 6:
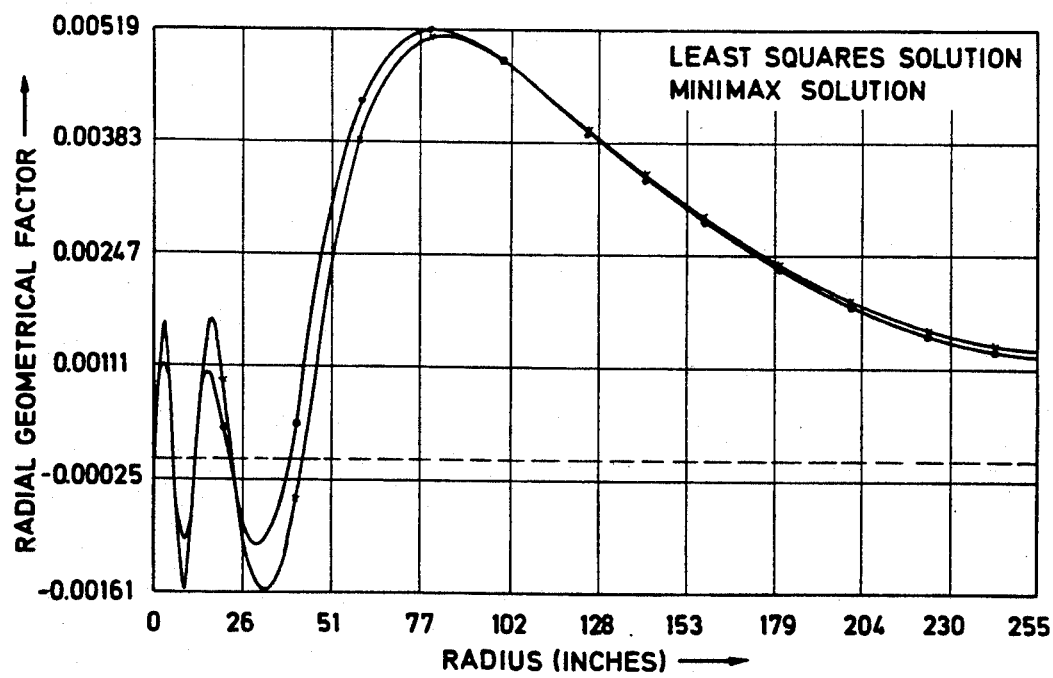

FIGS. 3 through 6 show the results of this focusing process. In each case, the radial response of five three-coil, mutually balanced sondes with main coil spacings of 1, 2, 3, 5 and 8 feet have been combined. Each sonde includes a one turn transmitter located at z=0 and two receivers located at L and L/2. FIG. 3 shows the five basis functions. They are identical except for scaling. Each is normalized to unit area. FIGS. 4 through 6 show the best linear combination of the basis functions in order to make the radial response function zero out to some limit. This limit varies from 6 to 48 inches. For each attempt, the "best" combination is defined in either a least squares sense or a Chebychev sense.

The Chebychev norm is equivalent to minimizing the maximum deviation between the actual and the desired response. The minimax solution always reaches equal deviations from the desired solution at a multiple of points, and that these maxima appear to be larger than the least squares solution. This multiple equal maxima deviation is a property of this norm. The apparent excess of the minimax norm is not true. In every case the least squares solution reaches a higher value at the boundary of the region where it is desired to achieve a value of zero.

Figure 7:
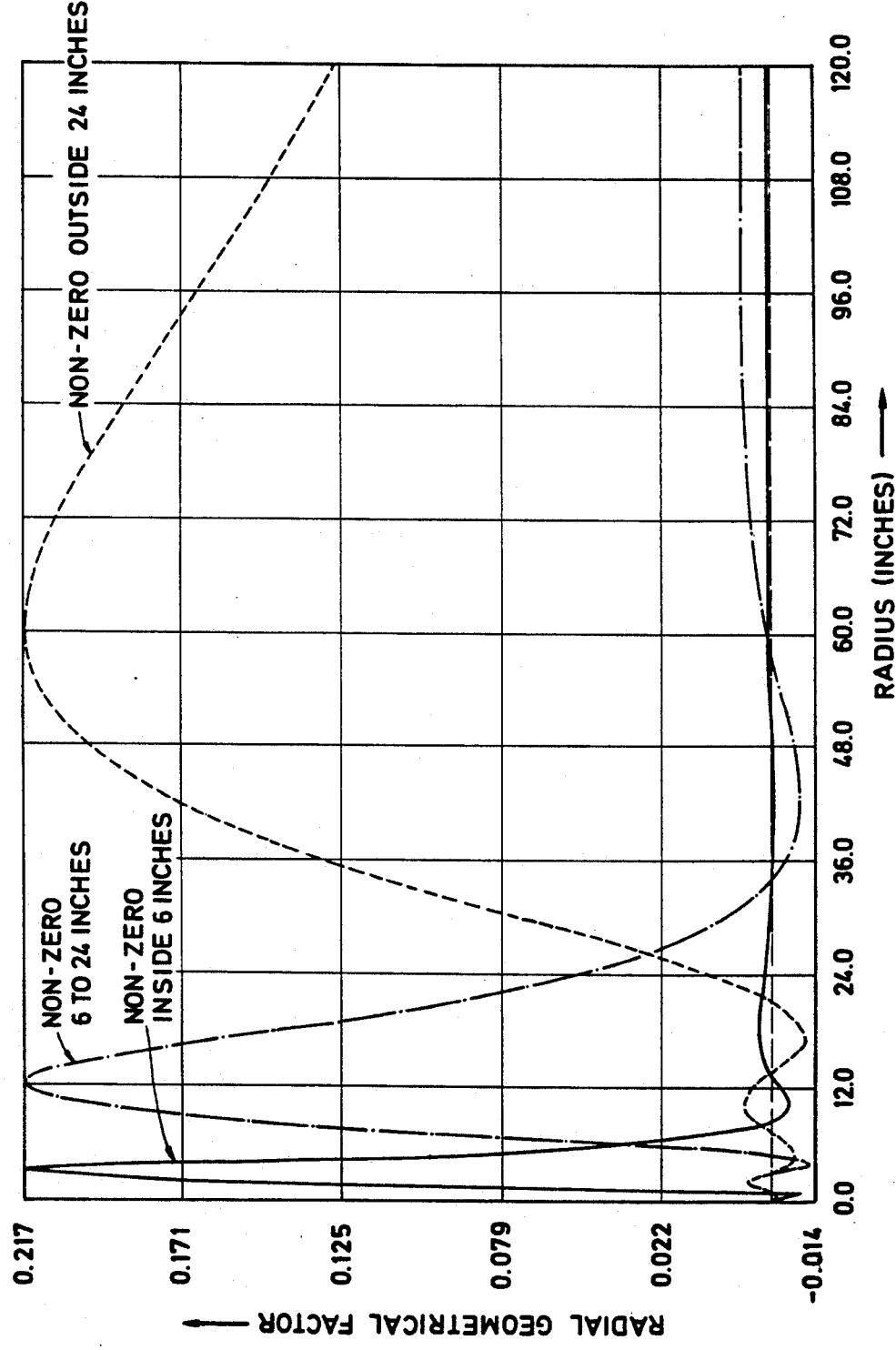
FIG. 7 illustrates composite radial response functions of the outputs of three coil arrays with coil spacings of 0.5, 1, 2, 4 and 8 feet optimally weighted to produce combined radial geometrical factors which are non-zero inside six inches, non-zero from six to twenty-four inches, and zero within twenty four inches (equivalently, non-zero outside 24 inches)

FIG. 7 shows three responses which are formed from the basis functions associated with array lengths of 0.5, 1, 2, 4, and 8 feet. In these cases, it is attempted to achieve responses which are nonzero only inside of six inches, only outside of 24 inches, and only between 6 and 24 inches. For this display, the curves are normalized to the same maximum vertical height. The software combination of these elemental sondes achieves far more separation of radial response that the currently available commercial tools. In addition, the responses are almost orthogonal, that is, they have little signal coming from the same radial part of the formation. This makes it far easier to interpret the invasion of the borehole. Using this method, a true conductivity profile can be produced by combining the separate sub-sondes in software to concentrate the response from a particular part of the formation.

These curves are achieved by combining radial response functions only. In a real tool it is important to achieve a balance between the radial performance and the other aspects of sonde response. In particular, the achievement of a very deep response requires a larger weighting on the longer arrays, while a shallow response requires a larger weighting on the shorter ones. Good vertical resolution is, of course, much easier with short sondes than with long ones. Thus there is the unavoidable problem of conflicting criteria. That is, it is difficult to achieve a good depth of investigation with a sonde which also has good vertical resolution. This means that the possibilities of obtaining a radial profile will be greatest for thick beds where there need not be as much concern with a sharp vertical response.

Multi-channel Deconvolution Filter Assuming Presence of Skin Effect

In high-conductivity formations, the response of an array depends not only upon its coil configuration but also upon the skin depth of the formation. This skin depth is dependent upon the product of the formation conductivity and the frequency of operation of the induction sonde. Since the frequency may be specified, and since the skin depth is very often an important length scale in the problem and is often the dominant one, the skin effect can be used to advantage in producing a localized measurement of conductivity.

As above, very simple sondes are used, e.g., a symmetrical sonde with a single transmitter and a pair of two-coil receiver arrays. Multiple channels of information are obtained by acquiring both in-phase and quadrature components of each array signal at several frequencies. The simple sonde described above operating at 20, 40, 100, and 200 kHz provides 16 channels, each with a different associated spatial response.

The inversion of this data requires an accurate model for the response functions of the arrays as a function of coil placement, conductivity and frequency. The Born approximation to the array response, which is the first term in an expansion of the response in powers of deviations in the conductivity from some average background conductivity provides the model.

The use of the Born approximation starts from a slightly different point of view than the deconvolution filter described above assuming low conductivity formations. If the formation may reasonably be determined to have an "average" or "background" conductivity $\sigma$, then it can be determined as to how the received voltage varies with changes in the formation conductivity.

This can be written in a form similar to the geometrical factor $$V(z) = V(\sigma) + \delta g b(\rho,z;\sigma)(\sigma(\rho,z-z') - \sigma) d\rho dz \qquad (23)$$

Here $gb(\rho,z : \sigma)$ is the Born response function or the Born kernal. The Born kernal is now complex. Following as above, two apparent conductivities are defined as $\sigma_{aR}(z) = K_R V_R(z)$ and $\sigma_{aX}(z) = K_{XR} V_X(z)$ based upon the normal resistive or upon the reactive signal. Thus these signals are now put on the same footing. The geometrical factor theory can be viewed as a special case of the more general Born approximation where the average conductivity is chosen to be zero.

Multi-channel deconvolution now looks just like the above analysis for low conductivity formations except for the inclusion of both R and X signals.

$$\sigma_d(z) = \sigma + \Sigma_n \Sigma_{z''} a_n(z'')(\sigma_{a,n}(z-z'') - \sigma_{a,n}(\sigma)) \qquad (24)$$

The index n now runs over all arrays and also over R and X signals.

Figure 8:
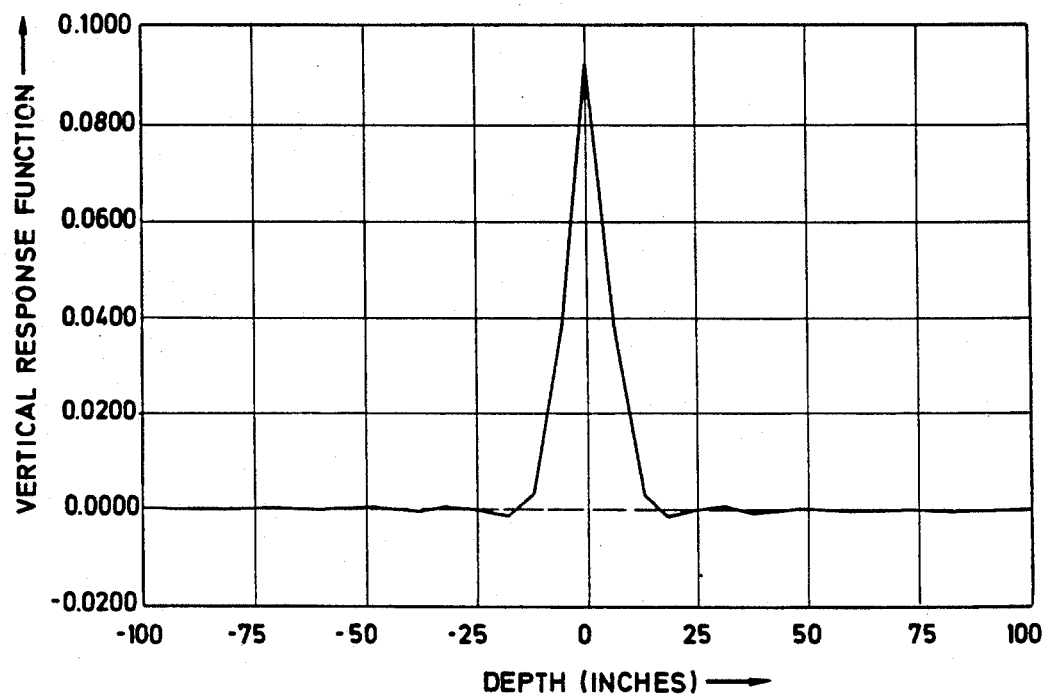
FIGS. 8 and 9 illustrate respectively the composite vertical response function and radial response function of a symmetrical balanced sonde with three foot arrays operating at multiple frequencies.
Figure 9:
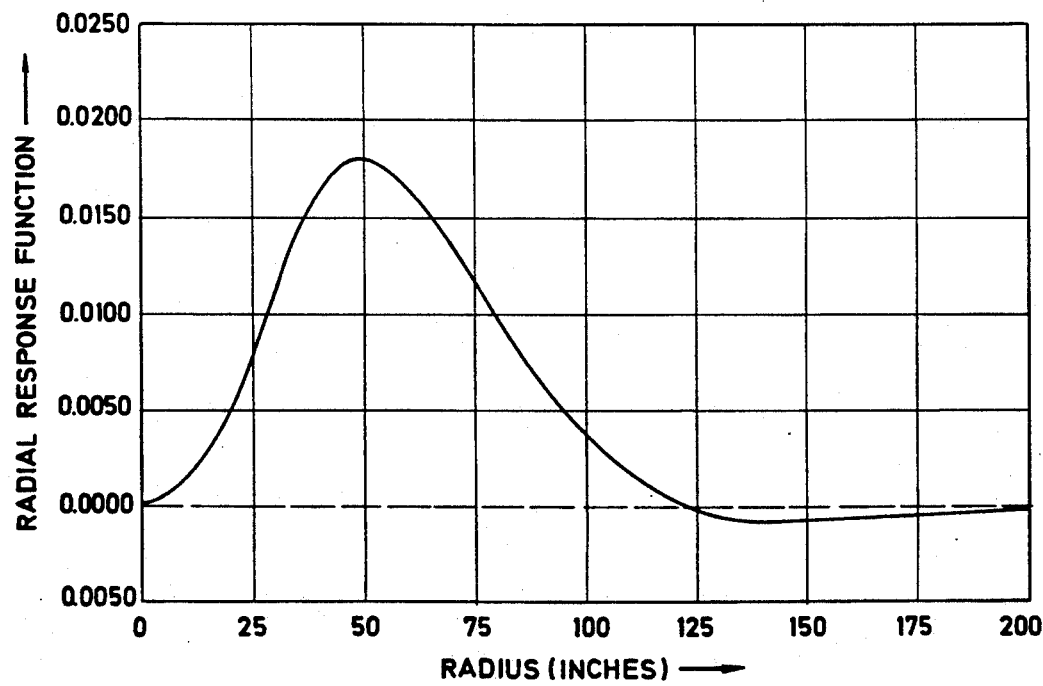
Figure 10:
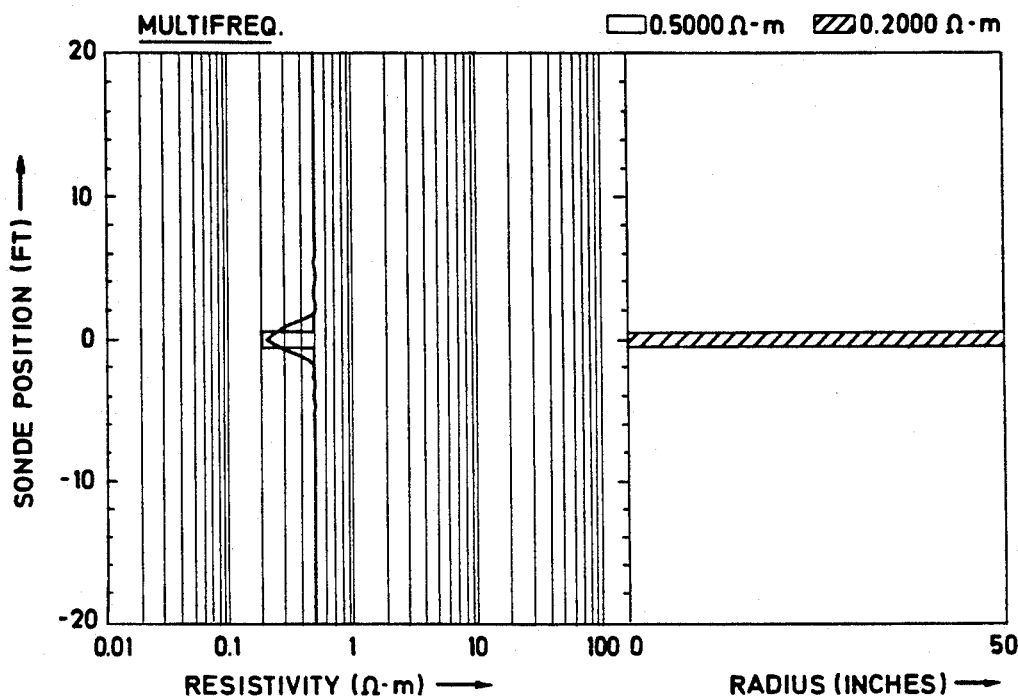
FIG. 10 illustrates a computed log of the logging apparatus according to the invention having vertical and radial characteristics of FIG. 8 and 9 showing resolution of a high conductivity one foot bed.

As an example of the use of multiple frequencies, the simple symmetric sonde shown in FIG. 1 may be considered. Each main coil spacing is 3 feet, making a total sonde length of 6 feet. Frequencies of operation are 20 and 40 kHz, yielding 8 channels (2 frequencies, in-phase and quadrature signal components, 2 arrays). The resulting response functions are shown in FIGS. 8 and 9. The vertical resolution is 5.5 inches and depth of investigation is 73 inches. There is virtually no response within a radius of 10 inches. A computed log of a layered formation (FIG. 10) shows this sonde capable of resolving a 1-ft high conductivity (low resistivity) bed. The technique works because the signals at 20 and 40 kHz for each array are weighted nearly equally and opposite in sign in the deconvolution filter. Thus, the total response is small near the borehole where skin-effect is small and is nearly frequency-independent, and numerically significant further into the formation where skin-effect results in a difference between the responses at the two frequencies. Small frequency differences result in large depths of investigation; as the frequency difference is made larger, the radial response of the sonde moves in toward the borehole axis.

Figure 11:
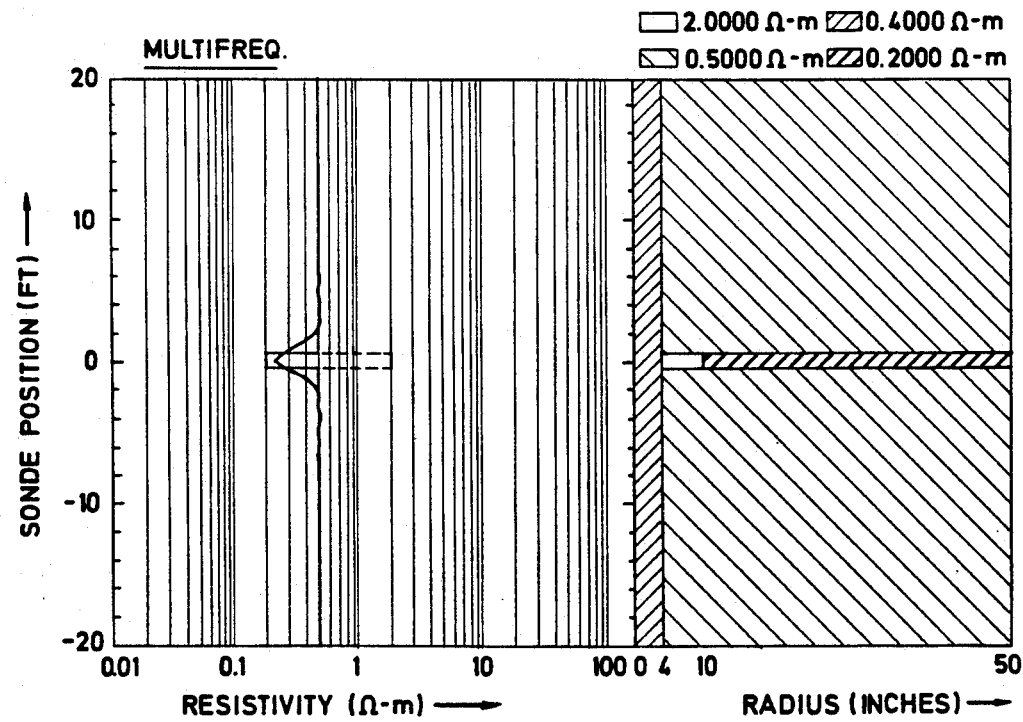
FIG. 11 illustrates a computed log from a sonde with array spacings 1, 2, and 3 feet, with each array operating at different combinations of multiple frequencies and shows the resolution of a very thin invaded bed.

Very thin invaded beds (where the bed thickness is on order or even less than the invasion diameter) represent a very difficult class of two-dimensional heterogeneities that often degrade the apparent resolution of a sonde as seen on a log. Additional formation information may be obtained by a sonde design using both multiple array spacings and multiple frequencies. FIG. 11 illustrates the log obtained from such a sonde with array spacings of 1, 2, and 3 feet. The one foot array pair operates at 20 and 160 kHz, the two foot sonde at 20 and 80 kHz, and the three foot array pair at 20 and 40 kHz. The one foot thick bed with a radius of invasion of 10 inches is well resolved.

Formation Radial Conductivity Profile From Multiple Frequency Responses

As discussed above, the response of a transmitter-receiver coil array is dependent on its transmitter frequency due to skin effect of the induced loop of current in the formation. At high frequencies, the loop current tends to flow in a radial band closer to the borehole. Conversely, at lower frequencies the induced loop current in the formation tends not to be so much influenced by skin effect and current flows in a radial based relatively further from the borehole than when a higher frequency is used.

Figure 12:
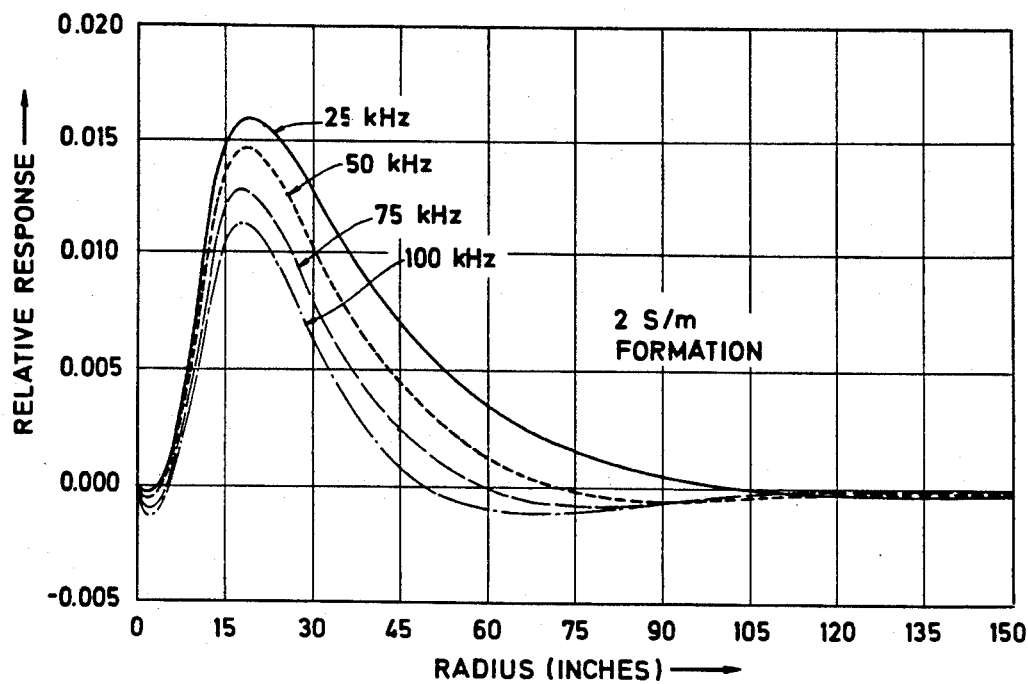
FIG. 12 illustrates the frequency dependence of a radial response function.

FIG. 12 illustrates the effect of frequency on radial depth of investigation. FIG. 12 shows relative response functions for a single three coil, three foot array in a formation of 2 S/M conductivity. The three coil, three foot array is one with a single transmitter with a two coil receiver array, where the receiver array has a primary coil receiver spaced three feet away from the transmitter and having a secondary receiver coil disposed between the primary receiver coil and the transmitter coil and is wound in the opposite direction from that of the primary receiver coil. As indicated above, the secondary receiver coil is in electrical series with the primary receiver coil and the mutual coupling signal induced in the secondary receiver coil tends to balance the mutual coupling signal induced in the primary receiver coil.

Figure 13:
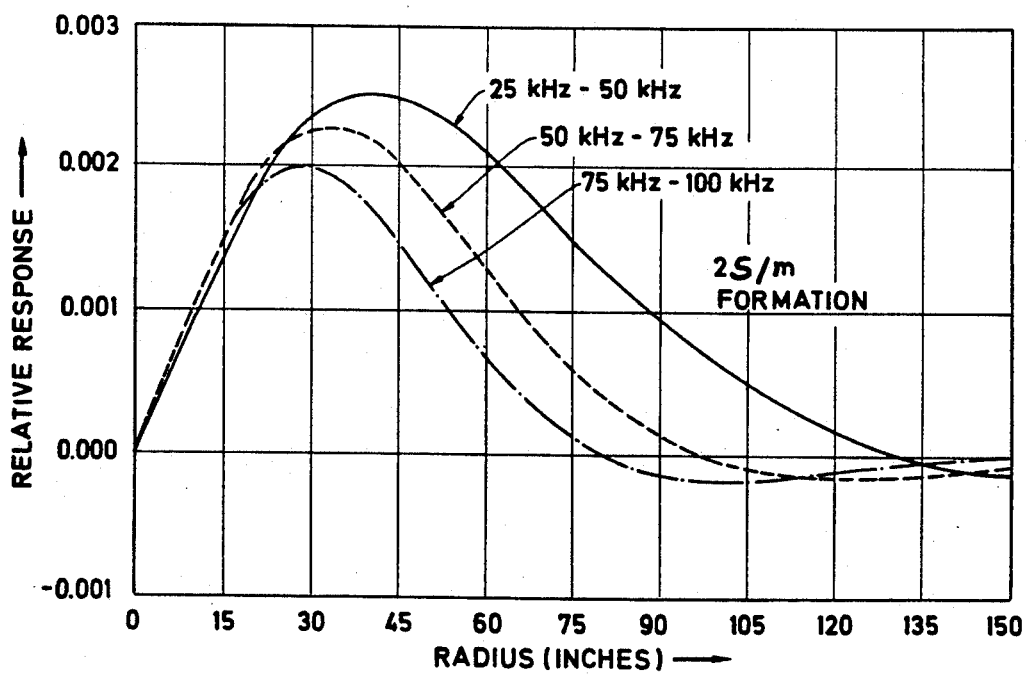
FIG. 13 illustrates the frequency dependence of differences of radial response functions.

FIG. 13 shows the relative response of the difference between several responses of FIG. 12. Specifically three different response functions are shown: the first is the difference between the 25 kHz response and the 50 kHz response; the second is the difference between the 50 kHz response and the 75 kHz response; the third is the difference between the 75 kHz response and the 100 kHz response. The first difference curve has the deepest depth of investigation, the second difference curve has not so deep a depth of investigation as the first, and the third difference curve has a more shallow depth of investigation than the other two curves.

Consequently, as shown above, operating a single induction coil array at multiple frequencies and taking the difference between responses at different frequencies provides a way advantageously to use "skin effect" to obtain a radial profile of the formation. By using the difference curves of FIG. 13, at each logging depth a plurality of resistivity or conductivity values for different radial distances from the borehole may be obtained. An inspection of FIG. 13 reveals that the depth of investigation of the "difference" response curves of FIG. 13 is each greater than any one of the individual frequency response curves of FIG. 12.

Preferred Sonde and Induction Logging System

Figure 14:
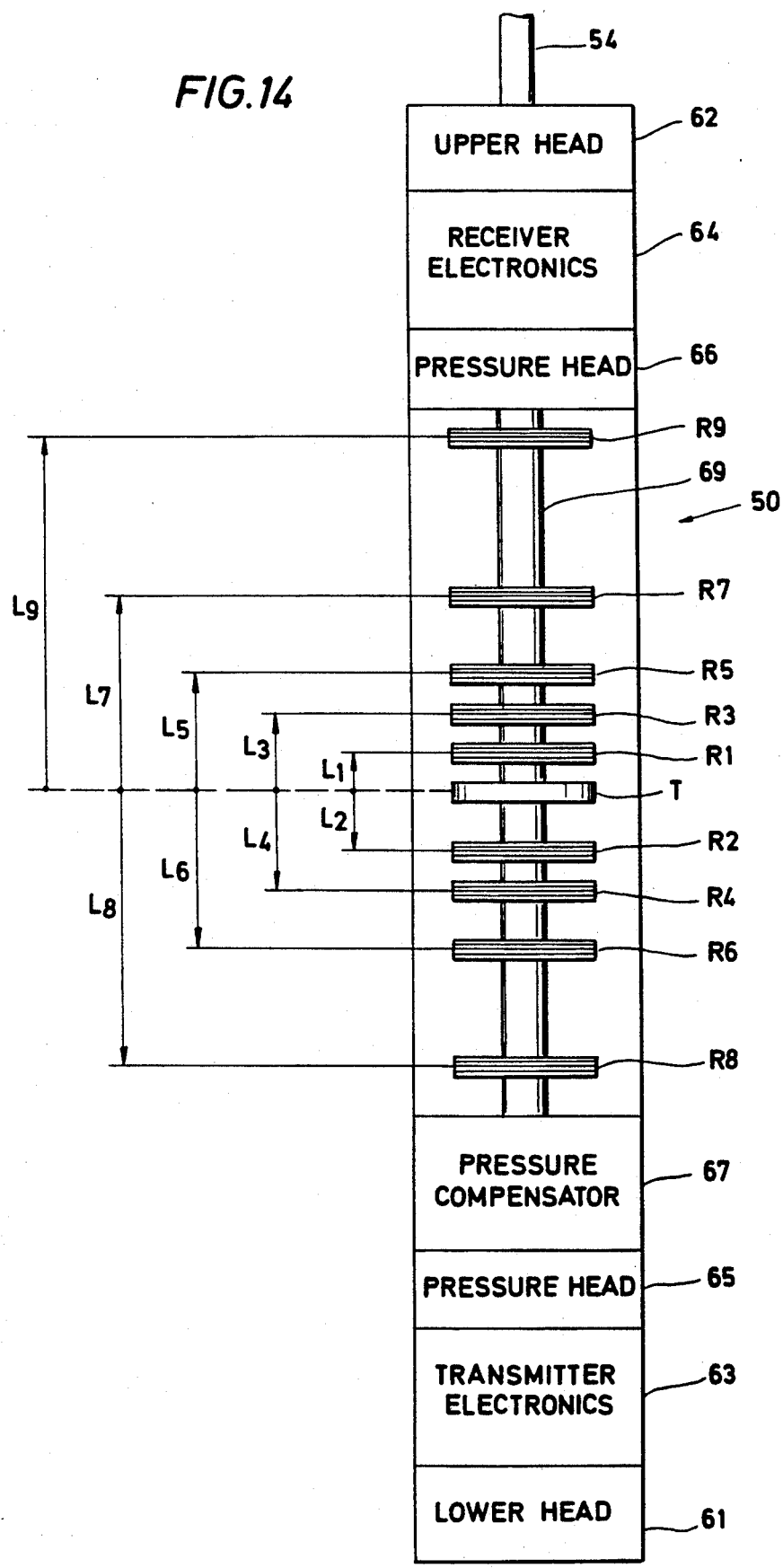
FIG. 14 illustrates a preferred embodiment of a logging sonde according to the invention.
Figure 15:
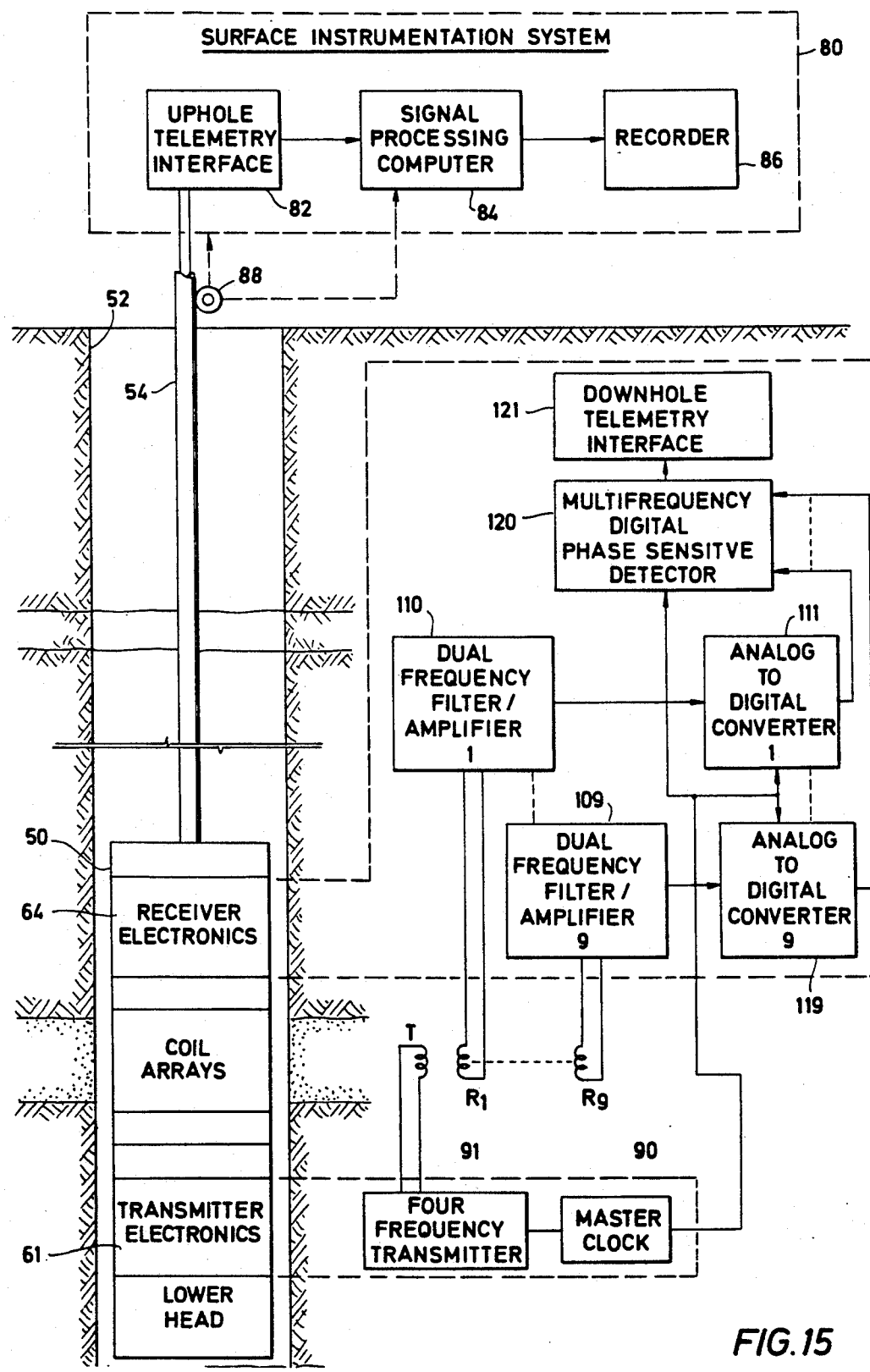
FIG. 15 schematically illustrates a system for multi-channel processing with multiple receivers showing down hole components for producing signals at each measurement location corresponding to the in-phase (R) and out-of-phase (X) components at each array for each driving frequency.

FIGS. 14 and 15 illustrate respectively the preferred downhole sonde and system of the invention. The sonde 50 includes a transmitter and receiver coil array having a single transmitter coil T and nine receiver arrays R1-R9. Each receiver array includes a pair of coils including a primary receiver coil and a secondary receiver coil placed between the primary receiver coil and the transmitter coil. For example, receiver coil R1 of sonde 50 includes a primary coil spaced a distance $L_1$ from transmitter coil T. The receiver coil array also includes, as indicated above, a series connected, oppositely would secondary receiver coil spaced between the transmitter coil and the primary receiver coil and has a number of turns on it to substantially eliminate or balance the mutual signal induced by mutual coupling between the transmitter and the receiver array.

The coil array of the sonde 50 uniquely includes an interweaving pattern, such that the receiver coil array having the next largest spacing from receiver array $R_1$ is placed below the transmitter coil T a distance $L_2$ which is greater in absolute terms than the distance $L_1$. Likewise, receiver array $R_3$ is placed above array $R_1$ at a distance $L_3$ from transmitter coil T. The distance $L_3$ is greater absolutely than is the distance $L_2$. Receiver coils $R_4$, $R_5$, $R_6$, $R_7$, $R_8$ and $R_9$ are placed above and below the transmitter coil T in the same pattern. That is, $L_4 > L_3$; $L_5 > L_4$; $L_6 > L_5$; $L_7 > L_6$; $L_8 > L_7$; and $L_9 > L_8$. The transmitter and receiver coils are preferably disposed on a metallic support 69 according to the construction described in U.S. Pat. No. 4,651,101, assigned to the assignee of this application. Such patent is incorporated herein.

The coil array and electrical leads or conductors connecting them to receiver electronics section 64 or transmitter electronics 63 are subject to the drilling fluid pressure of the well. The receiver electronics 64 and transmitter electronics 63 are mechanically isolated from the drilling fluid pressure. Pressure heads 66 and 65 and pressure compensator 67 provide electrical conductor paths protected from pressure between the electronics sections 64 and 63 and the transmitter and receiver coils. Lower head 61 serves as a connector to other logging tools to be placed below sonde 50 or as an end cap for the sonde 50. Upper head 62 serves as a connector to other logging tools which may be connected to sonde 50 or to the logging cable 54.

FIG. 15 is a schematic illustration of the sonde 50 of FIG. 14 suspended in a borehole 52 by a multiconductor wireline cable 54. The sonde 50 communicates with a surface instrumentation system 80 which includes an uphole telemetry system 82, a signal processing computer 84 and an output device such as recorder 86. A winch and a depth signal encoder 88 are provided for transporting the sonde 50 in the borehole and providing depth information to computer 84.

The transmitter electronics include a master clock 90 and a four frequency transmitter 91. The output of transmitter 91 drives transmitter coil T at four separate frequencies, preferably at about 25 kHz, 50 kHz, 100 kHz and 200 kHz. The receiver electronics preferably includes a dual frequency amplifier associated with a particular receiver coil array $R_1 \ldots R_9$. Amplifier 101 is associated with receiver $R_1$; $\ldots$ Amplifier 109 is associated with receiver $R_9$. Preferably, each amplifier is tuned so as to be responsive to at least two frequencies of the transmitter 91. The preferred frequency tuning for each of the amplifiers 101-109 is presented in Table I.

TABLE I

| Amplifier/Receiver Array | Spacing | Frequency(s) (kHz) |
|---|---|---|
| 101/R$_1$ | +L$_1$ | 100, 200 |
| 102/R$_2$ | −L$_2$ | 100, 200 |
| 103/R$_3$ | +L$_3$ | 50, 100 |
| 104/R$_4$ | −L$_4$ | 50, 100 |
| 105/R$_5$ | +L$_5$ | 25, 50 |
| 106/R$_6$ | −L$_6$ | 25, 50 |
| 107/R$_7$ | +L$_7$ | 25, 50 |
| 108/R$_8$ | −L$_8$ | 25, 50 |
| 109/R$_9$ | +L$_9$ | 25, 50 |

The output of each amplifier 101 $\ldots$ 109 is applied to an individual analog to digital (A/D) converter 111 $\ldots$ 119. At each three inch increment in borehole depth, the digital output of each A/D converter is applied to a digital multiple frequency phase sensitive detector 120 where the in-phase signal (R) and quadrature signal (X) of each receiver at each of the frequencies specified in Table I is detected. For example, the output of A/D converter 115, responsive to the receiver $R_5$, is resolved into four digital signals representing the received voltage v:

v[$R_5$, 25, R]
v[$R_5$, 25, X]
v[$R_5$, 50, R]
v[$R_5$, 50, X].

The signal at each of the receivers is resolved into separate signals at two frequencies, each further being resolved into its in-phase (R) component and out-of-phase (X) component. Consequently, at each three inch depth increment for each receiver, four signals are captured. Such signals are applied to downhole telemetry interface circuit 121 and transmitted for storage in Surface Instrumentation System 80 computer 84 via cable 54 and uphole telemetry interface 82. Such signals are depth tagged by means of encoder 88 which provides a simultaneous depth signal to computer 14. During logging operations, such depth tagged signals are stored in computer 84 for deconvolution processing according to a filter weighted sum of all the signals stored during the logging run. Such filter weights are preferably predetermined generally according to the techniques described above in the section labeled "multi-channel deconvolution filter assuming no skin effect" and in particular the section labeled "multi-channel deconvolution filter assuming pressure of skin effect".

One set of preferred filter weights for the preferred sonde of FIG. 12 is shown in Table II below. Such weights apply for the transmitter-primary receiver coil spacings shown below in Table III.

TABLE II

| OLFIN INCHES | R5R 50 KMZ | R5X 50 KMZ | R4R 50 KMZ | R4X 50 KMZ | R4R 100 KMZ | R4X 100 KMZ | R3R 100 KMZ | R2R 200 KMZ | R1R 200 KMZ | R9X 25 KMZ | R8X 25 KMZ | R8X 50 KMZ |
|---|---|---|---|---|---|---|---|---|---|---|---|---|
| 144.0000 | 0.0000 | 0.0000 | 0.0000 | 0.0000 | 0.0000 | 0.0000 | 0.0000 | 0.0000 | 0.0000 | 0.0167 | 0.0000 | 0.0000 |
| 141.0000 | 0.0000 | 0.0000 | 0.0000 | 0.0000 | 0.0000 | 0.0000 | 0.0000 | 0.0000 | 0.0000 | 0.0124 | 0.0000 | 0.0000 |
| 138.0000 | 0.0000 | 0.0000 | 0.0000 | 0.0000 | 0.0000 | 0.0000 | 0.0000 | 0.0000 | 0.0000 | 0.0092 | 0.0000 | 0.0000 |
| 135.0000 | 0.0000 | 0.0000 | 0.0000 | 0.0000 | 0.0000 | 0.0000 | 0.0000 | 0.0000 | 0.0000 | 0.0063 | 0.0000 | 0.0000 |
| 132.0000 | 0.0000 | 0.0000 | 0.0000 | 0.0000 | 0.0000 | 0.0000 | 0.0000 | 0.0000 | 0.0000 | 0.0056 | 0.0000 | 0.0000 |
| 129.0000 | 0.0000 | 0.0000 | 0.0000 | 0.0000 | 0.0000 | 0.0000 | 0.0000 | 0.0000 | 0.0000 | 0.0043 | 0.0000 | 0.0000 |
| 124.0000 | 0.0000 | 0.0000 | 0.0000 | 0.0000 | 0.0000 | 0.0000 | 0.0000 | 0.0000 | 0.0000 | −0.0035 | 0.0000 | 0.0000 |
| 123.0000 | 0.0000 | 0.0000 | 0.0000 | 0.0000 | 0.0000 | 0.0000 | 0.0000 | 0.0000 | 0.0000 | −0.0045 | 0.0000 | 0.0000 |
| 120.0000 | 0.0000 | 0.0000 | 0.0000 | 0.0000 | 0.0000 | 0.0000 | 0.0000 | 0.0000 | 0.0000 | −0.0014 | 0.0000 | 0.0000 |
| 117.0000 | 0.0000 | 0.0000 | 0.0000 | 0.0000 | 0.0000 | 0.0000 | 0.0000 | 0.0000 | 0.0000 | −0.0144 | 0.0000 | 0.0000 |
| 114.0000 | 0.0000 | 0.0000 | 0.0000 | 0.0000 | 0.0000 | 0.0000 | 0.0000 | 0.0000 | 0.0000 | −0.0304 | 0.0000 | 0.0000 |
| 111.0000 | 0.0000 | 0.0000 | 0.0000 | 0.0000 | 0.0000 | 0.0000 | 0.0000 | 0.0000 | 0.0000 | −0.0480 | 0.0000 | 0.0000 |
| 108.0000 | 0.0000 | 0.0000 | 0.0000 | 0.0000 | 0.0000 | 0.0000 | 0.0000 | 0.0000 | 0.0000 | −0.0532 | 0.0000 | 0.0000 |
| 105.0000 | 0.0000 | 0.0000 | 0.0000 | 0.0000 | 0.0000 | 0.0000 | 0.0000 | 0.0000 | 0.0000 | −0.0496 | 0.0000 | 0.0000 |
| 102.0000 | 0.0000 | 0.0000 | 0.0000 | 0.0000 | 0.0000 | 0.0000 | 0.0000 | 0.0000 | 0.0000 | −0.0785 | 0.0000 | 0.0000 |
| 99.0000 | 0.0000 | 0.0000 | 0.0000 | 0.0000 | 0.0000 | 0.0000 | 0.0000 | 0.0000 | 0.0000 | −0.0881 | 0.0000 | 0.0000 |
| 94.0000 | 0.0000 | 0.0000 | 0.0000 | 0.0000 | 0.0000 | 0.0000 | 0.0000 | 0.0000 | 0.0000 | −0.0870 | 0.0000 | 0.0000 |
| 93.0000 | 0.0000 | 0.0000 | 0.0000 | 0.0000 | 0.0000 | 0.0000 | 0.0000 | 0.0000 | 0.0000 | −0.0802 | 0.0000 | 0.0000 |
| 90.0000 | 0.0000 | 0.0000 | 0.0000 | 0.0000 | 0.0000 | 0.0000 | 0.0000 | 0.0000 | 0.0000 | −0.0769 | 0.0000 | 0.0000 |
| 87.0000 | 0.0000 | 0.0000 | 0.0000 | 0.0000 | 0.0000 | 0.0000 | 0.0000 | 0.0000 | 0.0000 | −0.0485 | 0.0000 | 0.0000 |
| 84.0000 | 0.0000 | 0.0000 | 0.0000 | 0.0000 | 0.0000 | 0.0000 | 0.0000 | 0.0000 | 0.0000 | −0.0119 | 0.0000 | 0.0000 |
| 81.0000 | 0.0000 | 0.0000 | 0.0000 | 0.0000 | 0.0000 | 0.0000 | 0.0000 | 0.0000 | 0.0000 | 0.0247 | 0.0000 | 0.0000 |
| 78.0000 | 0.0000 | 0.0000 | 0.0000 | 0.0000 | 0.0000 | 0.0000 | 0.0000 | 0.0000 | 0.0000 | 0.0252 | 0.0000 | 0.0000 |
| 75.0000 | 0.0000 | 0.0000 | 0.0000 | 0.0000 | 0.0000 | 0.0000 | 0.0000 | 0.0000 | 0.0000 | 0.1245 | 0.0000 | 0.0010 |
| 72.0000 | 0.0000 | 0.0000 | 0.0000 | 0.0000 | 0.0000 | 0.0000 | 0.0000 | 0.0000 | 0.0000 | 0.1703 | 0.0000 | 0.0000 |
| 69.0000 | 0.0000 | 0.0000 | 0.0000 | 0.0000 | 0.0000 | 0.0000 | 0.0000 | 0.0000 | 0.0000 | 0.1970 | 0.0000 | 0.0000 |
| 66.0000 | 0.0000 | 0.0000 | 0.0000 | 0.0000 | 0.0000 | 0.0000 | 0.0000 | 0.0000 | 0.0000 | 0.2135 | 0.0000 | 0.0000 |
| 63.0000 | 0.0000 | 0.0000 | 0.0000 | 0.0000 | 0.0000 | 0.0000 | 0.0000 | 0.0000 | 0.0000 | 0.2189 | 0.0000 | 0.0000 |
| 60.0000 | 0.0000 | 0.0000 | 0.0000 | 0.0000 | 0.0000 | 0.0000 | 0.0000 | 0.0000 | 0.0000 | 0.2048 | 0.0000 | 0.0000 |
| 57.0000 | 0.0000 | 0.0000 | 0.0000 | 0.0000 | 0.0000 | 0.0000 | 0.0000 | 0.0000 | 0.0000 | 0.1253 | 0.0000 | 0.0000 |
| 54.0000 | 0.0000 | 0.0000 | 0.0000 | 0.0000 | 0.0000 | 0.0000 | 0.0000 | 0.0000 | 0.0000 | 0.1172 | 0.0000 | 0.0000 |
| 51.0000 | 0.0000 | 0.0000 | 0.0000 | 0.0000 | 0.0000 | 0.0000 | 0.0000 | 0.0000 | 0.0000 | 0.0473 | 0.0219 | 0.0180 |
| 48.0000 | 0.0000 | 0.0000 | 0.0000 | 0.0000 | 0.0000 | 0.0000 | 0.0000 | 0.0000 | 0.0000 | 0.0378 | 0.0165 | 0.0100 |
| 45.0000 | 0.0108 | −0.1149 | 0.0000 | 0.0000 | 0.0000 | 0.0000 | 0.0000 | 0.0000 | 0.0000 | −0.003 | 0.0130 | 0.0059 |
| 42.0000 | 0.0244 | −0.1191 | 0.0000 | 0.0000 | 0.0000 | 0.0000 | 0.0000 | 0.0000 | 0.0000 | −0.0144 | 0.0123 | 0.0042 |
| 39.0000 | −0.0003 | −0.1001 | 0.0000 | 0.0000 | 0.0000 | 0.0000 | 0.0000 | 0.0000 | 0.0000 | −0.0194 | 0.0127 | 0.0045 |
| 34.0000 | 0.0387 | −0.0700 | 0.0000 | 0.0000 | 0.0000 | 0.0000 | 0.0000 | 0.0000 | 0.0000 | −0.0017 | 0.0134 | 0.0115 |
| 33.0000 | 0.0239 | −0.0327 | 0.0000 | 0.0000 | 0.0000 | 0.0000 | 0.0000 | 0.0000 | 0.0000 | 0.0160 | 0.0114 | 0.0047 |
| 30.0000 | −0.0130 | 0.0092 | 0.0000 | 0.0000 | 0.0000 | 0.0000 | 0.0000 | 0.0000 | 0.0000 | 0.0355 | 0.0054 | 0.0004 |
| 27.0000 | −0.0160 | 0.0532 | 0.0000 | 0.0000 | 0.0000 | 0.0000 | 0.0000 | 0.0000 | 0.0000 | 0.0418 | 0.0004 | −0.0055 |
| 24.0000 | −0.0357 | 0.0942 | 0.0000 | 0.0000 | 0.0000 | 0.0000 | −0.0430 | 0.0000 | 0.0000 | 0.0404 | −0.0070 | −0.0172 |
| 21.0000 | −0.0413 | 0.1426 | 0.0000 | 0.0000 | 0.0000 | 0.0000 | −0.0224 | 0.0000 | 0.0000 | 0.0434 | −0.0114 | −0.0257 |
| 16.0000 | −0.0421 | 0.1093 | 0.0000 | 0.0000 | 0.0000 | 0.0000 | −0.0294 | 0.0000 | 0.0000 | 0.0790 | −0.0108 | −0.0271 |
| 15.0000 | −0.0419 | 0.1304 | 0.0333 | −0.0932 | 0.0563 | −0.1419 | 0.0719 | 0.0000 | 0.0000 | 0.1125 | −0.0108 | −0.0305 |
| 12.0000 | −0.0598 | 0.1544 | −0.0162 | −0.0412 | 0.0555 | −0.1451 | 0.0402 | 0.0000 | 0.0264 | 0.1220 | 0.0154 | 0.0094 |
| 9.0000 | −0.0709 | 0.1610 | 0.0044 | −0.0512 | 0.0500 | −0.1180 | 0.0715 | 0.0147 | 0.0059 | 0.1247 | 0.0232 | 0.0134 |
| 4.0000 | −0.0560 | 0.1093 | 0.0019 | −0.0127 | 0.0127 | −0.0755 | 0.0198 | 0.0109 | −0.0077 | 0.1326 | 0.0420 | 0.0334 |
| 3.0000 | −0.0217 | 0.0459 | −0.0181 | 0.0257 | −0.0399 | −0.0312 | −0.0047 | −0.0412 | −0.0094 | 0.1319 | 0.0426 | 0.0541 |
| 0.0000 | 0.0000 | 0.0244 | −0.0371 | 0.0443 | −0.0912 | 0.0197 | −0.0444 | −0.0352 | −0.0149 | 0.1007 | 0.0746 | 0.0604 |
| −3.0000 | 0.0044 | −0.0134 | 0.0040 | 0.1056 | −0.0784 | 0.0728 | −0.0347 | −0.0160 | −0.0144 | 0.0475 | 0.0272 | −0.0232 |
| −4.0000 | 0.0103 | −0.0547 | 0.0328 | 0.1307 | −0.0480 | 0.1045 | −0.0377 | −0.0024 | −0.0094 | 0.0409 | 0.0418 | −0.0045 |
|  |  |  |  |  |  |  |  |  |  |  | 0.0474 | 0.0020 |

TABLE II-continued

| OLFIN INCHES | | | | | R7R 25 KMZ | R7X 25 KMZ | R7X 50 KMZ | R6R 25 KMZ | R6X 25 KMZ | R6R 50 KMZ | R6X 50 KMZ | R5R 25 KMZ | R5X 25 KMZ |
|---|---|---|---|---|---|---|---|---|---|---|---|---|---|
| −9.0000 | 0.0243 | −0.0904 | 0.0499 | 0.1419 | 0.0000 | 0.0000 | 0.1222 | −0.0230 | 0.0145 | 0.0000 | 0.0491 | 0.0513 | 0.0115 |
| −12.0000 | 0.0424 | −0.1080 | 0.0767 | 0.1294 | 0.0000 | 0.0000 | 0.1029 | −0.0312 | 0.0388 | 0.0000 | 0.0458 | 0.0492 | 0.0160 |
| −15.0000 | 0.0774 | −0.1104 | 0.0419 | 0.1043 | 0.0000 | 0.0000 | 0.0713 | 0.0000 | 0.0451 | 0.0000 | 0.0439 | 0.0380 | 0.0037 |
| −18.0000 | 0.0471 | −0.1133 | 0.0341 | 0.0705 | 0.0000 | 0.0000 | 0.0226 | 0.0000 | 0.0144 | 0.0000 | 0.0249 | 0.0344 | 0.0005 |
| −21.0000 | 0.0769 | −0.1224 | 0.0000 | 0.0334 | 0.0000 | 0.0000 | −0.0239 | 0.0000 | 0.0000 | 0.0000 | 0.0135 | 0.0279 | 0.0034 |
| −24.0000 | 0.0000 | 0.0000 | −0.0244 | 0.0075 | 0.0000 | 0.0000 | −0.0742 | 0.0000 | 0.0000 | 0.0000 | 0.0044 | 0.0302 | 0.0123 |
| −27.0000 | 0.0000 | 0.0000 | −0.0472 | −0.0551 | 0.0000 | 0.0000 | −0.1334 | 0.0000 | 0.0000 | 0.0000 | −0.0144 | 0.0347 | 0.0232 |
| −30.0000 | 0.0000 | 0.0000 | −0.0809 | −0.0454 | 0.0000 | 0.0000 | −0.1403 | 0.0000 | 0.0000 | 0.0000 | −0.0234 | 0.0545 | 0.0572 |
| −33.0000 | 0.0000 | 0.0000 | 0.0000 | 0.0000 | 0.0000 | 0.0000 | 0.0000 | 0.0000 | 0.0000 | 0.0000 | −0.0222 | 0.0811 | 0.0915 |
| −34.0000 | 0.0000 | 0.0000 | 0.0000 | 0.0000 | 0.0000 | 0.0000 | 0.0000 | 0.0000 | 0.0000 | 0.0000 | −0.0147 | 0.1049 | 0.1268 |
| −36.0000 | 0.0000 | 0.0000 | 0.0000 | 0.0000 | 0.0000 | 0.0000 | 0.0000 | 0.0000 | 0.0000 | 0.0000 | −0.0103 | 0.1341 | 0.1407 |
| −39.0000 | 0.0000 | 0.0000 | 0.0000 | 0.0000 | 0.0000 | 0.0000 | 0.0000 | 0.0000 | 0.0000 | 0.0000 | −0.0040 | 0.1425 | 0.1444 |
| −42.0000 | 0.0000 | 0.0000 | 0.0000 | 0.0000 | 0.0000 | 0.0000 | 0.0000 | 0.0000 | 0.0000 | 0.0000 | −0.0045 | 0.1744 | 0.1496 |
| −45.0000 | 0.0000 | 0.0000 | 0.0000 | 0.0000 | 0.0000 | 0.0000 | 0.0000 | 0.0000 | 0.0000 | 0.0000 | −0.0048 | 0.1734 | 0.1489 |
| −48.0000 | 0.0000 | 0.0000 | 0.0000 | 0.0000 | 0.0000 | 0.0000 | 0.0000 | 0.0000 | 0.0000 | 0.0000 | −0.0039 | 0.1590 | 0.1310 |
| −51.0000 | 0.0000 | 0.0000 | 0.0000 | 0.0000 | 0.0000 | 0.0000 | 0.0000 | 0.0000 | 0.0000 | 0.0000 | −0.0025 | 0.1344 | 0.0424 |
| −54.0000 | 0.0000 | 0.0000 | 0.0000 | 0.0000 | 0.0000 | 0.0000 | 0.0000 | 0.0000 | 0.0000 | 0.0000 | −0.0008 | 0.1144 | 0.0371 |
| −57.0000 | 0.0000 | 0.0000 | 0.0000 | 0.0000 | 0.0000 | 0.0000 | 0.0000 | 0.0000 | 0.0000 | 0.0000 | 0.0002 | 0.0254 | −0.0274 |
| −60.0000 | 0.0000 | 0.0000 | 0.0000 | 0.0000 | 0.0000 | 0.0000 | 0.0000 | 0.0000 | 0.0000 | 0.0000 | 0.0004 | 0.0204 | −0.1115 |
| −63.0000 | 0.0000 | 0.0000 | 0.0000 | 0.0000 | 0.0000 | 0.0000 | 0.0000 | 0.0000 | 0.0000 | 0.0000 | 0.0014 | −0.0257 | −0.1739 |
| −66.0000 | 0.0000 | 0.0000 | 0.0000 | 0.0000 | 0.0000 | 0.0000 | 0.0000 | 0.0000 | 0.0000 | 0.0000 | 0.0024 | −0.0474 | −0.2255 |
| −69.0000 | 0.0000 | 0.0000 | 0.0000 | 0.0000 | 0.0000 | 0.0000 | 0.0000 | 0.0000 | 0.0000 | 0.0000 | 0.0024 | −0.1035 | −0.2434 |
| −72.0000 | 0.0000 | 0.0000 | 0.0000 | 0.0000 | 0.0000 | 0.0000 | 0.0000 | 0.0000 | 0.0000 | 0.0000 | 0.0000 | −0.1234 | −0.2752 |
| −75.0000 | 0.0000 | 0.0000 | 0.0000 | 0.0000 | 0.0000 | 0.0000 | 0.0000 | 0.0000 | 0.0000 | 0.0000 | 0.0000 | −0.1141 | −0.2400 |
| −78.0000 | 0.0000 | 0.0000 | 0.0000 | 0.0000 | 0.0000 | 0.0000 | 0.0000 | 0.0000 | 0.0000 | 0.0000 | 0.0000 | −0.0805 | −0.1724 |
| −81.0000 | 0.0000 | 0.0000 | 0.0000 | 0.0000 | 0.0000 | 0.0000 | 0.0000 | 0.0000 | 0.0000 | 0.0000 | 0.0000 | −0.0541 | −0.1144 |
| −84.0000 | 0.0000 | 0.0000 | 0.0000 | 0.0000 | 0.0000 | 0.0000 | 0.0000 | 0.0000 | 0.0000 | 0.0000 | 0.0000 | −0.0276 | −0.0421 |
| −87.0000 | 0.0000 | 0.0000 | 0.0000 | 0.0000 | 0.0000 | 0.0000 | 0.0000 | 0.0000 | 0.0000 | 0.0000 | 0.0000 | −0.0097 | −0.0254 |
| −90.0000 | 0.0000 | 0.0000 | 0.0000 | 0.0000 | 0.0000 | 0.0000 | 0.0000 | 0.0000 | 0.0000 | 0.0000 | 0.0000 | −0.0019 | −0.0080 |
| −93.0000 | 0.0000 | 0.0000 | 0.0000 | 0.0000 | 0.0000 | 0.0000 | 0.0000 | 0.0000 | 0.0000 | 0.0000 | 0.0000 | −0.0035 | −0.0087 |
| −96.0000 | 0.0000 | 0.0000 | 0.0000 | 0.0000 | 0.0000 | 0.0000 | 0.0000 | 0.0000 | 0.0000 | 0.0000 | 0.0000 | 0.0044 | 0.0054 |
| −99.0000 | 0.0000 | 0.0000 | 0.0000 | 0.0000 | 0.0000 | 0.0000 | 0.0000 | 0.0000 | 0.0000 | 0.0000 | 0.0000 | 0.0049 | 0.0109 |
| −102.0000 | 0.0000 | 0.0000 | 0.0000 | 0.0000 | 0.0000 | 0.0000 | 0.0000 | 0.0000 | 0.0000 | 0.0000 | 0.0000 | 0.0132 | 0.0219 |
| −105.0000 | 0.0000 | 0.0000 | 0.0000 | 0.0000 | 0.0000 | 0.0000 | 0.0000 | 0.0000 | 0.0000 | 0.0000 | 0.0000 | 0.0193 | 0.0319 |
| −108.0000 | 0.0000 | 0.0000 | 0.0000 | 0.0000 | 0.0000 | 0.0000 | 0.0000 | 0.0000 | 0.0000 | 0.0000 | 0.0000 | 0.0000 | 0.0000 |
| 144.0000 | | | | | 0.0000 | 0.0000 | 0.0000 | 0.0000 | 0.0000 | 0.0000 | 0.0000 | 0.0000 | 0.0000 |
| 141.0000 | | | | | 0.0000 | 0.0000 | 0.0000 | 0.0000 | 0.0000 | 0.0000 | 0.0000 | 0.0000 | 0.0000 |
| 138.0000 | | | | | 0.0000 | 0.0000 | 0.0000 | 0.0000 | 0.0000 | 0.0000 | 0.0000 | 0.0000 | 0.0000 |
| 135.0000 | | | | | 0.0000 | 0.0000 | 0.0000 | 0.0000 | 0.0000 | 0.0000 | 0.0000 | 0.0000 | 0.0000 |
| 132.0000 | | | | | 0.0000 | 0.0000 | 0.0000 | 0.0000 | 0.0000 | 0.0000 | 0.0000 | 0.0000 | 0.0000 |
| 129.0000 | | | | | 0.0000 | 0.0000 | 0.0000 | 0.0000 | 0.0000 | 0.0000 | 0.0000 | 0.0000 | 0.0000 |
| 126.0000 | | | | | 0.0000 | 0.0000 | 0.0000 | 0.0000 | 0.0000 | 0.0000 | 0.0000 | 0.0000 | 0.0000 |
| 123.0000 | | | | | 0.0000 | 0.0000 | 0.0000 | 0.0000 | 0.0000 | 0.0000 | 0.0000 | 0.0000 | 0.0000 |
| 120.0000 | | | | | 0.0000 | 0.0000 | 0.0000 | 0.0000 | 0.0000 | 0.0000 | 0.0000 | 0.0000 | 0.0000 |
| 117.0000 | | | | | 0.0000 | 0.0000 | 0.0000 | 0.0000 | 0.0000 | 0.0000 | 0.0000 | 0.0000 | 0.0000 |
| 114.0000 | | | | | 0.0000 | 0.0000 | 0.0000 | 0.0000 | 0.0000 | 0.0000 | 0.0000 | 0.0000 | 0.0000 |
| 111.0000 | | | | | 0.0000 | 0.0000 | 0.0000 | 0.0000 | 0.0000 | 0.0000 | 0.0000 | 0.0000 | 0.0000 |
| 108.0000 | | | | | 0.0000 | 0.0000 | 0.0000 | 0.0000 | 0.0000 | 0.0000 | 0.0000 | 0.0000 | 0.0000 |
| 105.0000 | | | | | 0.0000 | 0.0000 | 0.0000 | 0.0000 | 0.0000 | 0.0000 | 0.0000 | 0.0000 | 0.0000 |
| 102.0000 | | | | | 0.0000 | 0.0000 | 0.0000 | 0.0000 | 0.0000 | 0.0000 | 0.0000 | 0.0000 | 0.0000 |
| 99.0000 | | | | | 0.0000 | 0.0000 | 0.0000 | 0.0000 | 0.0000 | 0.0000 | 0.0000 | 0.0000 | 0.0000 |

TABLE II-continued

| | | | | | | | | | |
|---|---|---|---|---|---|---|---|---|---|
| 94.0000 | 0.0000 | 0.0000 | 0.0000 | 0.0000 | 0.0000 | 0.0000 | 0.0000 | 0.0000 | 0.0000 |
| 93.0000 | 0.0000 | 0.0000 | 0.0000 | 0.0000 | 0.0000 | 0.0000 | 0.0000 | 0.0000 | 0.0000 |
| 90.0000 | 0.0000 | 0.0000 | 0.0000 | 0.0000 | 0.0000 | 0.0000 | 0.0000 | 0.0000 | 0.0000 |
| 87.0000 | 0.0000 | 0.0000 | 0.0000 | 0.0000 | 0.0000 | 0.0000 | 0.0000 | 0.0000 | 0.0000 |
| 84.0000 | 0.0000 | 0.0000 | 0.0000 | 0.0000 | 0.0000 | 0.0000 | 0.0000 | 0.0000 | 0.0000 |
| 81.0000 | 0.0000 | 0.0000 | 0.0000 | 0.0000 | 0.0000 | 0.0000 | 0.0000 | 0.0000 | 0.0000 |
| 78.0000 | 0.0259 | 0.0091 | 0.0000 | 0.0000 | 0.0000 | 0.0000 | 0.0000 | 0.0000 | 0.0000 |
| 75.0000 | −0.0047 | 0.0045 | 0.0320 | 0.0000 | 0.0000 | 0.0000 | 0.0000 | 0.0000 | 0.0000 |
| 72.0000 | 0.0023 | −0.0230 | −0.0233 | 0.0000 | 0.0000 | 0.0000 | 0.0000 | 0.0000 | 0.0000 |
| 69.0000 | −0.0333 | −0.0482 | −0.0639 | 0.0000 | 0.0000 | 0.0000 | 0.0000 | 0.0000 | 0.0000 |
| 66.0000 | 0.0168 | −0.0451 | −0.1048 | 0.0000 | 0.0000 | 0.0000 | 0.0000 | 0.0000 | 0.0000 |
| 63.0000 | −0.0009 | −0.0764 | −0.1341 | 0.0000 | 0.0000 | 0.0000 | 0.0000 | 0.0000 | 0.0000 |
| 60.0000 | 0.0037 | −0.0744 | −0.1475 | 0.0000 | 0.0000 | 0.0000 | 0.0000 | 0.0000 | 0.0000 |
| 57.0000 | 0.0029 | −0.0712 | −0.1545 | 0.0000 | 0.0000 | 0.0000 | 0.0000 | 0.0000 | 0.0000 |
| 54.0000 | −0.0025 | −0.0881 | −0.1954 | 0.0000 | 0.0000 | 0.0000 | 0.0000 | 0.0000 | 0.0000 |
| 51.0000 | −0.0454 | −0.0491 | −0.1441 | 0.0000 | 0.0000 | 0.0000 | 0.0000 | 0.0000 | 0.0000 |
| 48.0000 | −0.1814 | −0.0135 | −0.0981 | 0.0000 | 0.0000 | 0.0000 | 0.0000 | 0.0000 | 0.0000 |
| 45.0000 | −0.1982 | 0.0244 | −0.0412 | 0.0000 | 0.0000 | 0.0000 | 0.0000 | 0.0000 | 0.0000 |
| 42.0000 | −0.1954 | 0.0594 | 0.0138 | 0.0000 | 0.0000 | 0.0000 | 0.0000 | −0.0345 | −0.0409 |
| 39.0000 | −0.1447 | 0.0490 | 0.0429 | 0.0000 | 0.0000 | 0.0000 | 0.0000 | −0.0140 | −0.0540 |
| 34.0000 | 0.0441 | 0.1172 | 0.1124 | 0.0000 | 0.0000 | 0.0000 | 0.0000 | −0.0224 | −0.1390 |
| 33.0000 | −0.0202 | 0.1329 | 0.1442 | 0.0000 | 0.0000 | 0.0000 | 0.0000 | 0.0342 | −0.0144 |
| 30.0000 | 0.0558 | 0.1412 | 0.1444 | 0.0000 | 0.0000 | 0.0000 | 0.0000 | 0.0344 | 0.0097 |
| 27.0000 | 0.1091 | 0.1380 | 0.1449 | −0.0160 | 0.0412 | −0.0942 | 0.0000 | 0.0205 | 0.0374 |
| 24.0000 | 0.1345 | 0.1294 | 0.1542 | −0.0113 | 0.0542 | −0.0411 | 0.0000 | 0.0351 | 0.0454 |
| 21.0000 | 0.1224 | 0.1148 | 0.1310 | −0.0117 | 0.0518 | −0.0965 | −0.0687 | 0.0310 | 0.0915 |
| 16.0000 | 0.0021 | 0.1004 | 0.1057 | −0.0047 | 0.0511 | −0.1129 | −0.0549 | 0.0378 | 0.1137 |
| 15.0000 | 0.0854 | 0.0935 | 0.0983 | −0.0076 | 0.0439 | −0.1255 | −0.0580 | 0.0443 | 0.1283 |
| 12.0000 | 0.0134 | 0.0321 | 0.0298 | 0.0407 | 0.0232 | −0.1211 | −0.0441 | 0.0440 | 0.1321 |
| 9.0000 | 0.0334 | 0.0701 | 0.0382 | −0.0029 | 0.0189 | −0.0941 | −0.0419 | 0.0224 | 0.1216 |
| 4.0000 | −0.0322 | 0.0595 | 0.0143 | −0.0094 | −0.0034 | −0.0254 | −0.0140 | 0.0012 | 0.1020 |
| 3.0000 | −0.0948 | 0.0445 | −0.0155 | −0.0029 | −0.0125 | −0.0499 | −0.0325 | 0.0019 | 0.0743 |
| 0.0000 | −0.1341 | 0.0251 | −0.0491 | −0.0429 | −0.0440 | −0.0200 | 0.0034 | 0.0204 | 0.0510 |
| −3.0000 | −0.2224 | −0.0100 | −0.1054 | −0.0299 | −0.0723 | 0.0250 | 0.0241 | 0.0348 | 0.0270 |
| −4.0000 | 0.0238 | −0.0045 | −0.0027 | 0.0074 | −0.0509 | 0.0710 | 0.0523 | 0.0143 | −0.0004 |
| −9.0000 | 0.0441 | −0.0344 | −0.1224 | 0.0535 | −0.0143 | 0.1135 | 0.1057 | 0.0175 | −0.0232 |
| −12.0000 | 0.0458 | −0.0531 | −0.1553 | 0.0434 | 0.0008 | 0.1474 | 0.1241 | 0.0195 | −0.0325 |
| −15.0000 | 0.0948 | −0.0553 | −0.1501 | 0.0442 | −0.0017 | 0.1481 | 0.1393 | 0.0435 | −0.0441 |
| −18.0000 | 0.0117 | −0.0418 | −0.1107 | 0.0712 | −0.0217 | 0.1721 | 0.1435 | 0.0027 | −0.0504 |
| −21.0000 | 0.0116 | −0.0258 | −0.0427 | 0.0304 | −0.0412 | 0.1411 | 0.1385 | 0.0235 | −0.0411 |
| −24.0000 | 0.0234 | −0.0117 | −0.0492 | −0.0172 | −0.1021 | 0.01320 | 0.1232 | 0.0000 | 0.0000 |
| −27.0000 | 0.0493 | −0.0014 | −0.0227 | −0.0527 | −0.1243 | 0.0917 | 0.1010 | 0.0000 | 0.0000 |
| −30.0000 | 0.0044 | 0.0000 | 0.0013 | −0.0526 | −0.1121 | 0.0487 | 0.0743 | 0.0000 | 0.0000 |
| −33.0000 | 0.0037 | 0.0149 | 0.0200 | −0.0512 | −0.0947 | 0.0020 | 0.0488 | 0.0000 | 0.0000 |
| −34.0000 | 0.0094 | 0.0217 | 0.0318 | −0.0433 | −0.0477 | −0.0549 | 0.0143 | 0.0000 | 0.0000 |
| −39.0000 | 0.0308 | 0.0234 | 0.0375 | 0.0489 | 0.0501 | −0.1178 | −0.0251 | 0.0000 | 0.0000 |
| −42.0000 | 0.0000 | 0.0000 | 0.0000 | 0.0351 | 0.0441 | −0.1843 | −0.0493 | 0.0000 | 0.0000 |
| −45.0000 | 0.0000 | 0.0000 | 0.0000 | −0.0528 | −0.0093 | −0.1934 | −0.0805 | 0.0000 | 0.0000 |
| −48.0000 | 0.0000 | 0.0000 | 0.0000 | −0.0005 | 0.0541 | −0.1935 | −0.0877 | 0.0000 | 0.0000 |
| −51.0000 | 0.0000 | 0.0000 | 0.0000 | −0.0322 | 0.0298 | −0.1815 | −0.0868 | 0.0000 | 0.0000 |
| −54.0000 | 0.0000 | 0.0000 | 0.0000 | −0.0124 | 0.0517 | −0.1597 | −0.0295 | 0.0000 | 0.0000 |
| −57.0000 | 0.0000 | 0.0000 | 0.0000 | 0.0000 | 0.0000 | 0.0000 | 0.0000 | 0.0000 | 0.0000 |
| −60.0000 | 0.0000 | 0.0000 | 0.0000 | 0.0000 | 0.0000 | 0.0000 | 0.0000 | 0.0000 | 0.0000 |

TABLE II-continued

| | | | | | | | | |
|---|---|---|---|---|---|---|---|---|
| −43.0000 | 0.0000 | 0.0000 | 0.0000 | 0.0000 | 0.0000 | 0.0000 | 0.0000 | 0.0000 |
| −44.0000 | 0.0000 | 0.0000 | 0.0000 | 0.0000 | 0.0000 | 0.0000 | 0.0000 | 0.0000 |
| −49.0000 | 0.0000 | 0.0000 | 0.0000 | 0.0000 | 0.0000 | 0.0000 | 0.0000 | 0.0000 |
| −72.0000 | 0.0000 | 0.0000 | 0.0000 | 0.0000 | 0.0000 | 0.0000 | 0.0000 | 0.0000 |
| −75.0000 | 0.0000 | 0.0000 | 0.0000 | 0.0000 | 0.0000 | 0.0000 | 0.0000 | 0.0000 |
| −78.0000 | 0.0000 | 0.0000 | 0.0000 | 0.0000 | 0.0000 | 0.0000 | 0.0000 | 0.0000 |
| −81.0000 | 0.0000 | 0.0000 | 0.0000 | 0.0000 | 0.0000 | 0.0000 | 0.0000 | 0.0000 |
| −84.0000 | 0.0000 | 0.0000 | 0.0000 | 0.0000 | 0.0000 | 0.0000 | 0.0000 | 0.0000 |
| −87.0000 | 0.0000 | 0.0000 | 0.0000 | 0.0000 | 0.0000 | 0.0000 | 0.0000 | 0.0000 |
| −90.0000 | 0.0000 | 0.0000 | 0.0000 | 0.0000 | 0.0000 | 0.0000 | 0.0000 | 0.0000 |
| −93.0000 | 0.0000 | 0.0000 | 0.0000 | 0.0000 | 0.0000 | 0.0000 | 0.0000 | 0.0000 |
| −96.0000 | 0.0000 | 0.0000 | 0.0000 | 0.0000 | 0.0000 | 0.0000 | 0.0000 | 0.0000 |
| −99.0000 | 0.0000 | 0.0000 | 0.0000 | 0.0000 | 0.0000 | 0.0000 | 0.0000 | 0.0000 |
| −102.0000 | 0.0000 | 0.0000 | 0.0000 | 0.0000 | 0.0000 | 0.0000 | 0.0000 | 0.0000 |
| −105.0000 | 0.0000 | 0.0000 | 0.0000 | 0.0000 | 0.0000 | 0.0000 | 0.0000 | 0.0000 |
| −108.0000 | 0.0000 | 0.0000 | 0.0000 | 0.0000 | 0.0000 | 0.0000 | 0.0000 | 0.0000 |

TABLE III

Preferred Transmitter - Primary Receiver Spacings

| Receiver Coil | Spacing from Transmitter |
| --- | --- |
| $R_1$ | $L_1 = 6''$ |
| $R_2$ | $L_2 = 9''$ |
| $R_3$ | $L_3 = 12''$ |
| $R_4$ | $L_4 = 15''$ |
| $R_5$ | $L_5 = 21''$ |
| $R_6$ | $L_6 = 27''$ |
| $R_7$ | $L_7 = 39''$ |
| $R_8$ | $L_8 = 54''$ |
| $R_9$ | $L_9 = 72''$ |

The filter weights of Table II, stored in computer 84 are applied to all of the measurement signals at the three inch borehole measurement increments. For example, in determining the conductivity at a particular depth (corresponding to 0.00 inches in Table II), a weighted sum of the measured voltages is made for the $v[R_1, 200, R]$ signals at three inch measurement points above and below the particular depth, depth=0, plus the weighted sum for the $v(R_2, 200, R)$ signals and so on. For example, from Table II, and equation 24, $$\sigma_A(\text{depth} = 0) - \sigma = (-.0149)(K_{R1}\nu[R_1, 200, R]_{depth=0} - K_{R1}\nu(R, 200, \sigma) +$$
$$(-.0094)(K_{R1}\nu[R_1, 200, R]_{depth=+3''} - K_{R1}\nu(R, 200, \sigma) +$$
$$(-.0077)(K_{R1}\nu[R_1, 200, R]_{depth=+6''} - K_{R1}\nu(R, 200, \sigma) +$$
$$\vdots$$
$$(.0352)(K_{R2}\nu[R_2, 200, R]_{depth=0} - K_{R2}\nu(R_2, 200, \sigma) +$$
$$\vdots$$
$$(.1097)(K_{R9}\nu[R_9, 25, R]_{depth=0} - K_{R9}\nu(R_9, 25, \sigma)$$

where $\sigma$ is a prior determined average conductivity of the formation and $K_R$ is a constant of proportionality. Note that for the preferred embodiment of the invention certain signals are not included (or in other words they are weighted with zero weights): $[R_9 25, R]$, $[R_8, 25, R]$, $[R_8, 50, R]$, $[R_7, 50, R]$, $[R_3, 100, X]$, $[R_2, 200, X]$ and $[R_1, 200, X]$.

A log of conductivity versus depth may be produced from the conductivity determination at each depth on recorder 86.

Various modifications and alterations in the described structures will be apparent to those skilled in the art of the foregoing description which does not depart from the spirit of the invention. For example, the tool illustrated in FIG. 14 may be placed in a measurement sub in a drilling string for measurement-while-drilling (MWD) applications. Communication with surface instrumentation may be by means other than a logging cable. A pulse monitoring system known in the MWD art may be used. For this reason, these changes are desired to be included in the appended claims. The appended claims recite the only limitation to the present invention and the descriptive manner which is employed for setting forth the embodiments and is to be interpreted as illustrative and not limitative.

What is claimed is:

1. Apparatus for electromagnetically exploring earth formations traversed by a borehole, comprising:
   a transmitter coil adapted to be passed through the borehole;
   at least a first receiver coil means adapted to be passed through the borehole;
   a source of electrical energy coupled to said transmitter coil, said source including at least two oscillating signals, the frequencies f1 and f2 of oscillations of said signals each being substantially constant and being different from each other;
   electrical receiving means coupled to said first receiver coil means for producing a first receiver signal frequency f1 and a second receiver signal at frequency f2;
   means for separating said first receiver signal of frequency f1 into its in-phase and quadrature components relative to the first oscillating signal;
   means for separating said second receiver signal of frequency f2 into its in-phase and quadrature components relative to the second oscillating signal;
   processing means for combining said in-phase and quadrature components of said first receiver signal and said in-phase and quadrature components of said second receiver signal into an output signal representative of a characteristic of the formation; and
   means for recording said output signal on a record medium.

2. The apparatus of claim 1, further comprising:
   a second receiver coil means adapted to be passed through the borehole;
   electrical receiving means coupled to said second receiver coil means for producing a third receiver signal at frequency f1 and a fourth receiver signal at frequency f2,
   means for separating said third receiver signal of frequency f1 into its in-phase and quadrature components relative to the first oscillating signal; and
   means for separating said fourth receiver signal of frequency f2 into its in-phase and quadrature components relative to the second oscillating signal,
   said processing means further combining the in-phase and quadrature components of said third and fourth receiver signals with the in-phase and quadrature components of said first and second receiver signals to produce said output signal representative of said characteristic of the formation.

3. The apparatus of claim 1, further comprising:
   means for disposing said transmitter coil and said receiver coil means at two axially spaced depths z1 and z2 in the borehole at two different moments of time for producing said first receiver signal at frequency f1 at depth z1 and at depth z2 and for producing said second receiver signal at frequency f2 at depth z1 and at depth z2,
   said processing means combining said first receiver signal at depth z1, said first receiver signal at depth z2, said second receiver signal at depth z1, and said second receiver signal at depth z2 to produce said output signal representative of said characteristic of the formation.

4. Apparatus for electromagnetically exploring earth formations traversed by a borehole, comprising:

a tool adapted to be passed through the borehole having, a longitudinal support member, a single transmitter coil coaxially mounted on said support member, a plurality of receiver arrays R1, R2, R3, etc, coaxially mounted on said support member, each of said arrays having a primary receiver coil disposed a longitudinal distance L1, L2, L3, etc, from the transmitter coil, the odd numbered receiver arrays R1, R3, R5, etc, being mounted on one longitudinal side of said transmitter coil, the even numbered receiver arrays R2, R4, R6, etc, being mounted on another longitudinal side of said transmitter coil, and a source of electrical energy coupled to said transmitter coil, said source including at least two oscillating signals, the frequencies f1 and f2 of oscillation of said signals each being substantially constant and being different from one another;

electrical receiving means coupled to said receiver arrays to produce first, second, third, etc, receiver signals;

processing means for combining said receiver signals and producing an output signal representative of a characteristic of the formations; and means for recording said output signal on an output record medium.

5. The apparatus of claim 4, wherein each of said receiver arrays includes a secondary receiver coil connected in series with its respective primary receiver coil and wound in the opposite direction as its respective primary receiver coil and coaxially longitudinally disposed on said support member between said transmitter coil and its respective primary receiver coil so as to substantially balance a signal in its receiver array which results from mutual inductive coupling from said transmitter coil.

6. The apparatus of claim 4, wherein said receiver arrays include nine receiver arrays R1, R2, ..., R9, the distance of each receiver array from the transmitter coil being as follows:

L1 = +6 inches,
L2 = −9 inches,
L3 = +12 inches,
L4 = −15 inches,
L5 = +21 inches,
L6 = −27 inches,
L7 = +39 inches,
L8 = −54 inches, and
L9 = +72 inches.

7. The apparatus of claim 6, wherein said source of electrical energy includes four oscillating signals, the frequencies f1, f2 f3, and f4 of oscillation of said signals each being substantially constant and being different from each other as follows:

f1 = 25 kHz,
f2 = 50 kHz,
f3 = 100 kHz, and
f4 = 200 kHz.

8. The apparatus of claim 7, wherein said electrical receiving means comprises:

means for separating each of said receiver signals into specific frequency receiver signals corresponding to at least one of said frequencies of said source of electrical energy coupled to said transmitter coil, and means for separating each of said specific frequency receiver signals into its in-phase (R) component and its out-of-phase (X) component.

9. The apparatus of claim 8, further comprising:

means for disposing said tool at a plurality of measurement locations in the borehole;

said electrical receiving means storing said in-phase (R) component and said out-of-phase (X) component for each of said specific frequency receiver signals at each of said measurement locations, and said processing means combining said in-phase (R) component and said out-of-phase (X) component for each of said specific frequency receiver signals at each of said measurement locations in unequal proportions to develop said output signal representative of a characteristic of the formation at a particular measurement location in the borehole.

10. The apparatus of claim 4, wherein said source of electrical energy includes at least four oscillating signals, the frequencies f1, f2, f3 and f4 of oscillation of said signals each being substantially constant and being different from each other.

11. Apparatus for electromagnetically exploring earth formations traversed by a borehole, comprising:

a transmitter coil adapted to be passed through the borehole;

a first receiver array of receiver coils adapted to be passed through the borehole and disposed an effective distance L above said transmitter coil and constructed such that the mutual inductance between the transmitter coil and the first receiver array is approximately zero;

a second receiver array of receiver coils adapted to be passed through the borehole and disposed an approximately identical effective distance L below said transmitter coil and constructed such that the mutual inductance between the transmitter coil and the second receiver array is approximately zero;

a source of electrical energy coupled to said transmitter coil, said source including at least two oscillating signals, the frequencies f1 and f2 of oscillation of said signals being different from each other;

electrical receiving means coupled to said first receiver array of receiver coils for producing a first voltage receiver signal at frequency f1 and a second voltage receiver signal at frequency f2;

electrical receiving means coupled to said second receiver array of receiver coils for producing a third voltage receiver signal at frequency f1 and a fourth voltage receiver signal at frequency f2;

processing means for combining the first, second, third, and fourth voltage receiver signals for producing an output signal representative of a characteristic of the formation; and means for recording said output signal on an output record medium.

12. The apparatus of claim 11, further comprising:

means for separating said first and third voltage signals of frequency f1 into their respective in-phase and quadrature components relative to said first oscillating signal; and means for separating said second and fourth voltage signals at frequency f2 into their respective in-phase and quadrature components relative to said second oscillating signal, said processing means combining said in-phase and quadrature components of said first, second, third and fourth signals into an output signal representative of a characteristic of the formation.

13. Apparatus for electromagnetically exploring earth formations traversed by a borehole, comprising:
   a transmitter coil adapted to be passed through the borehole;
   a first receiver array of receiver coils adapted to be passed through the borehole and disposed an effective distance L above said transmitter coil and constructed such that the mutual inductance between the transmitter coil and the first receiver array is approximately zero;
   a second receiver array of receiver coils adapted to be passed through the borehole and disposed an approximately identical effective distance L below said transmitter coil and constructed such that the mutual inductance between the transmitter coil and the second receiver array is approximately zero;
   a source of electrical energy coupled to said transmitter coil;
   electrical receiving means coupled to said first receiver array and to said second receiver array to produce respectively a first voltage receiver signal and a second voltage receiver signal;
   processing means for combining said first voltage receiver signal and said second voltage receiver signal thereby producing an output signal representative of a characteristic of the formations; and
   means for recording said output signal as a function of borehole depth on an output record medium.

14. The apparatus of claim 13, wherein each of the first and second receiver arrays of receiver coils comprises:
   a far coil disposed a distance L from said transmitter coil and having a number of turns N; and
   a near coil connected in series with said far coil and disposed a distance L/2 from said transmitter coil and wound in the opposite sense as said far coil and having one-eighth as many turns as said far coil.

15. The apparatus of claim 14, wherein said output signal is representative of the resistivity of the formations adjacent said transmitter coil and said first and second receiver arrays, and wherein the apparatus further comprises:
   means for transporting said coils through said borehole.

16. In a logging system having a transmitter coil and a receiver coil adapted to be passed through the borehole, a method for obtaining an output signal representative of a characteristic of a formation traversed by said borehole at a radial depth of the formation and recording said output signal on a record medium, comprising the steps of:
   applying two oscillating current signals to said transmitter coil, the frequencies f1 and f2 of oscillation of said signals being different from each other;
   receiving a first receiver signal from said receiver coil at frequency f1 and receiving a second receiver signal from said receiver coil at frequency f2;
   obtaining said output signal by differencing the first and second receiver signals, said output signal being representative of a characteristic of the formation at a greater radial depth than the radial depth associated with said first receiver signal or said second receiver signal; and
   recording said output signal on a record medium.

17. A method for electromagnetically exploring earth formations traversed by a borehole, comprising the steps of:
   transporting a transmitter coil and at least a first receiver coil array through the borehole;
   applying a source of electrical energy to said transmitter coil, said source including at least two oscillating signals, the frequencies f1 and f2 of said signals each being substantially constant and being different from each other;
   producing a first receiver array signal at frequency f1 and a second receiver array signal at frequency f2;
   separating said first receiver array signal of frequency f1 into its in-phase and quadrature components relative to the first oscillating signal;
   separating said second receiver array signal of frequency f2 into its in-phase and quadrature components relative to the second oscillating signal;
   combining the in-phase and quadrature components of said first receiver array signal with the in-phase and quadrature components of said second receiver array signal thereby producing an output signal representative of a characteristic of the formation; and
   recording said output signal on an output record medium.

18. The method of claim 17, further comprising the steps of:
   simultaneously transporting a second receiver coil array with said first receiver coil array through said borehole; and
   producing a third receiver array signal at frequency f1 and a fourth receiver array signal at frequency f2;
   wherein the combining step further comprises the step of,
   combining the third and fourth receiver array signals with the first and second receiver array signals operably producing said output signal representative of a characteristic of the formation.

19. The method of claim 18, further comprising the steps of:
   separating said third receiver array signal of frequency f1 into its in-phase and quadrature components relative to the first oscillating signal;
   separating said fourth receiver array signal at frequency f2 into its in-phase and quadrature components relative to said second oscillating signal; and
   combining the in-phase and quadrature components of the first, second, third, and fourth receiver array signals thereby producing said output signal representative of a characteristic of the formation.

20. The method of claim 17, further comprising:
   disposing said transmitter coil and said receiver coil array at two axially spaced depths z1 and z2 in the borehole at two different moments of time for producing said first receiver array signal at frequency f1 at depth z1 and at depth z2 and for producing said second receiver array signal at frequency f2 at depth z1 and at depth z2;
   wherein said combining step comprises the step of,
   combining said first receiver array signal at depth z1, said first receiver array signal at depth z2, said second receiver array signal at depth z1, and said second receiver array signal at depth z2 to produce said output signal representative of a characteristic of the formation.

21. Apparatus for electromagnetically exploring earth formations traversed by a borehole, comprising:
- a transmitter coil adapted to be passed through the borehole;
- at least a first receiver coil means adapted to be passed through the borehole;
- a source of electrical energy coupled to said transmitter coil, said source including at least two oscillating signals, the frequencies f1 and f2 of oscillation of said oscillating signals each being substantially constant and being different from each other;
- electrical receiving means coupled to said first receiver coil means for producing a first receiver signal at frequency f1 and a second receiver signal at frequency f2;
- a second receiver coil means adapted to be passed through the borehole;
- electrical receiving means coupled to said second receiver coil means for producing a third receiver signal at frequency f1 and a fourth receiver signal at frequency f2;
- means for separating said first and third receiver signals of frequency f1 into their in-phase and quadrature components relative to the first oscillating signal;
- means for separating said second and fourth receiver signals of frequency f2 into their respective in-phase and quadrature components relative to the second oscillating signal;
- processing means for combining the in-phase and quadrature components of said first, second, third, and fourth receiver signals to produce an output signal representative of a characteristic of the formation; and
- means for recording said output signal on an output record medium.

22. A method for electromagnetically exploring earth formations traversed by a borehole, comprising the steps of:
- transporting a transmitter coil and at least a first receiver coil array through the borehole;
- applying a source of electrical energy to said transmitter coil, said electrical energy including at least two oscillating signals, the frequencies f1 and f2 of the oscillating signals being substantially constant and being different from each other;
- producing a first receiver array signal at frequency f1 and producing a second receiver array signal at frequency f2;
- simultaneously transporting a second receiver coil array through said borehole with said first receiver coil array;
- producing a third receiver array signal at frequency f1 and a fourth receiver array signal at frequency f2;
- separating said first and third receiver array signals of frequency f1 into their respective in-phase and quadrature components relative to said first oscillating signal;
- separating said second and fourth receiver array signals at frequency f2 into their respective in-phase and quadrature components relative to said second oscillating signal;
- combining said in-phase and quadrature components of said first, second, third and fourth receiver array signals into an output signal representative of a characteristic of the formation; and
- recording said output signal on an output record medium.

* * * * *